United States Patent
Pavlak et al.

(10) Patent No.: US 6,516,270 B2
(45) Date of Patent: *Feb. 4, 2003

(54) APPARATUS AND METHOD FOR DELIVERING FEED RATIONS ALONG A FEEDBUNK USING A GLOBAL POSITIONING SYSTEM

(75) Inventors: Thomas Pavlak, Garden City, KS (US); Arlen Anderson, Windsor, CO (US); James Carisch, Denver, CO (US); Michael A. Ackerman, Windsor, CO (US)

(73) Assignee: Lextron, Inc., Greeley, CO (US)

(*) Notice: Subject to any disclaimer, the term of this patent is extended or adjusted under 35 U.S.C. 154(b) by 12 days.

This patent is subject to a terminal disclaimer.

(21) Appl. No.: 09/733,334

(22) Filed: Dec. 8, 2000

(65) Prior Publication Data

US 2002/0007798 A1 Jan. 24, 2002

Related U.S. Application Data

(63) Continuation of application No. 09/044,648, filed on Mar. 19, 1998, now Pat. No. 6,216,053, which is a continuation-in-part of application No. 08/863,646, filed on May 27, 1997, now Pat. No. 5,878,402, which is a continuation of application No. 08/364,424, filed on Dec. 27, 1994, now Pat. No. 5,636,118, which is a continuation of application No. 08/248,390, filed on May 24, 1994, now abandoned, which is a continuation of application No. 07/973,450, filed on Nov. 9, 1992, now abandoned.

(51) Int. Cl.$^7$ .................... A01K 5/02; G06F 17/00; G01C 21/02

(52) U.S. Cl. ............. 701/213; 701/215; 342/357.06; 700/241

(58) Field of Search .................. 701/213, 50, 208, 701/2, 117, 24, 28, 215; 342/357.06, 357.13, 357.17; 700/241, 231, 240; 340/989, 990; 348/114, 120

(56) References Cited

U.S. PATENT DOCUMENTS

| | | | |
|---|---|---|---|
| 5,008,821 A | * | 4/1991 | Pratt et al. ............... 119/51.01 |
| 5,119,102 A | | 6/1992 | Barnard |
| 5,424,957 A | | 6/1995 | Kerkhoff et al. |
| 5,598,770 A | | 2/1997 | Campbell et al. |
| 5,699,244 A | | 12/1997 | Clark, Jr. et al. |

FOREIGN PATENT DOCUMENTS

WO    WO 98/01023    1/1998

* cited by examiner

Primary Examiner—Michael J. Zanelli
(74) Attorney, Agent, or Firm—Morgan, Lewis & Bockius, LLP

(57) ABSTRACT

An animal feedlot management system for uniformly delivering assigned feed rations to feedbunks associated with animal pens in a feedlot, in which discretion and direct control over the various suboperations of the feed ration assignment and delivery process are distributed among the individual operators in the system while the feedlot manage is capable of indirectly monitoring the performance of the various suboperations through use of a satellite based global positioning system.

15 Claims, 21 Drawing Sheets

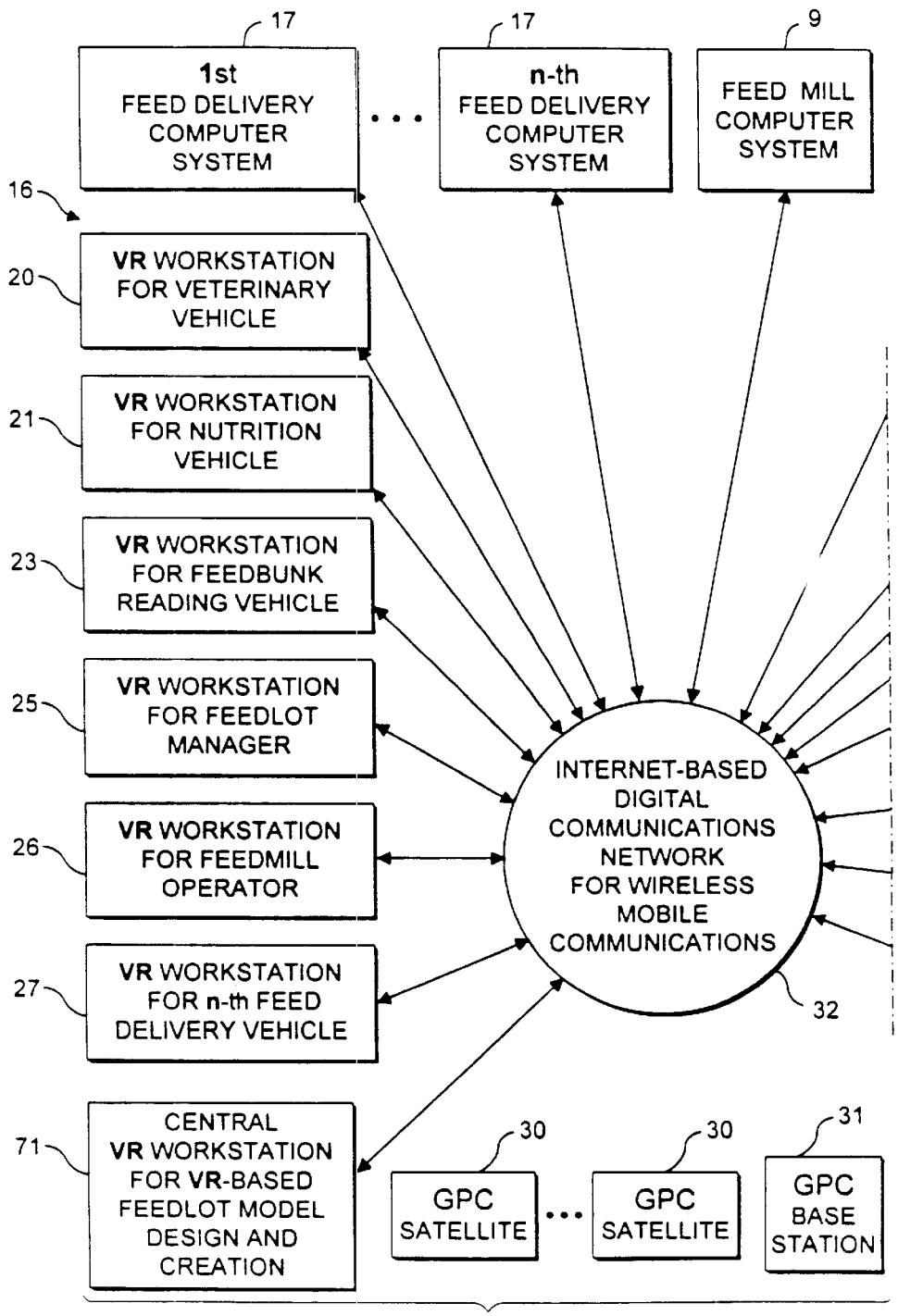
FIG. 2A1-1

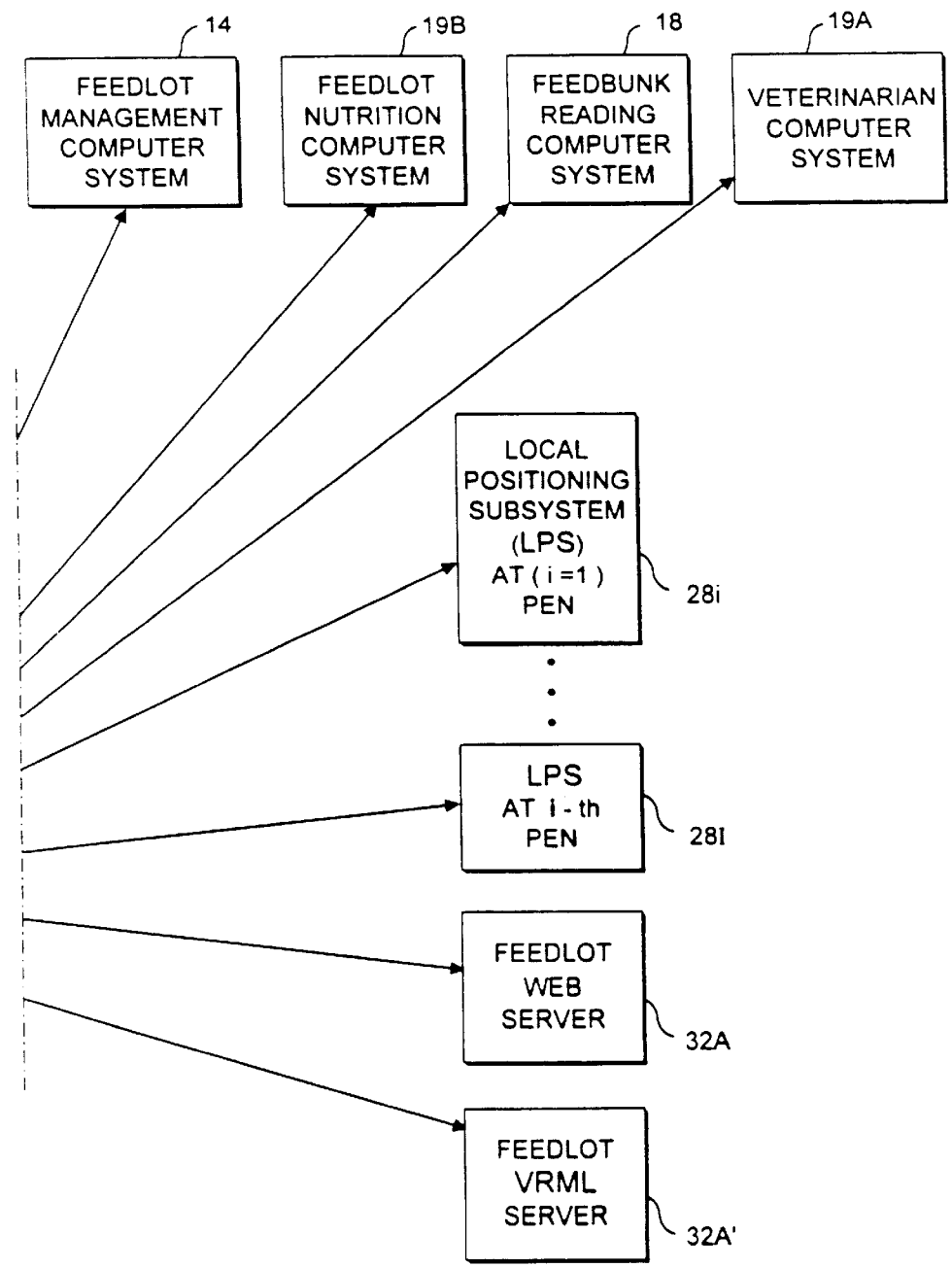
FIG. 2A1-2

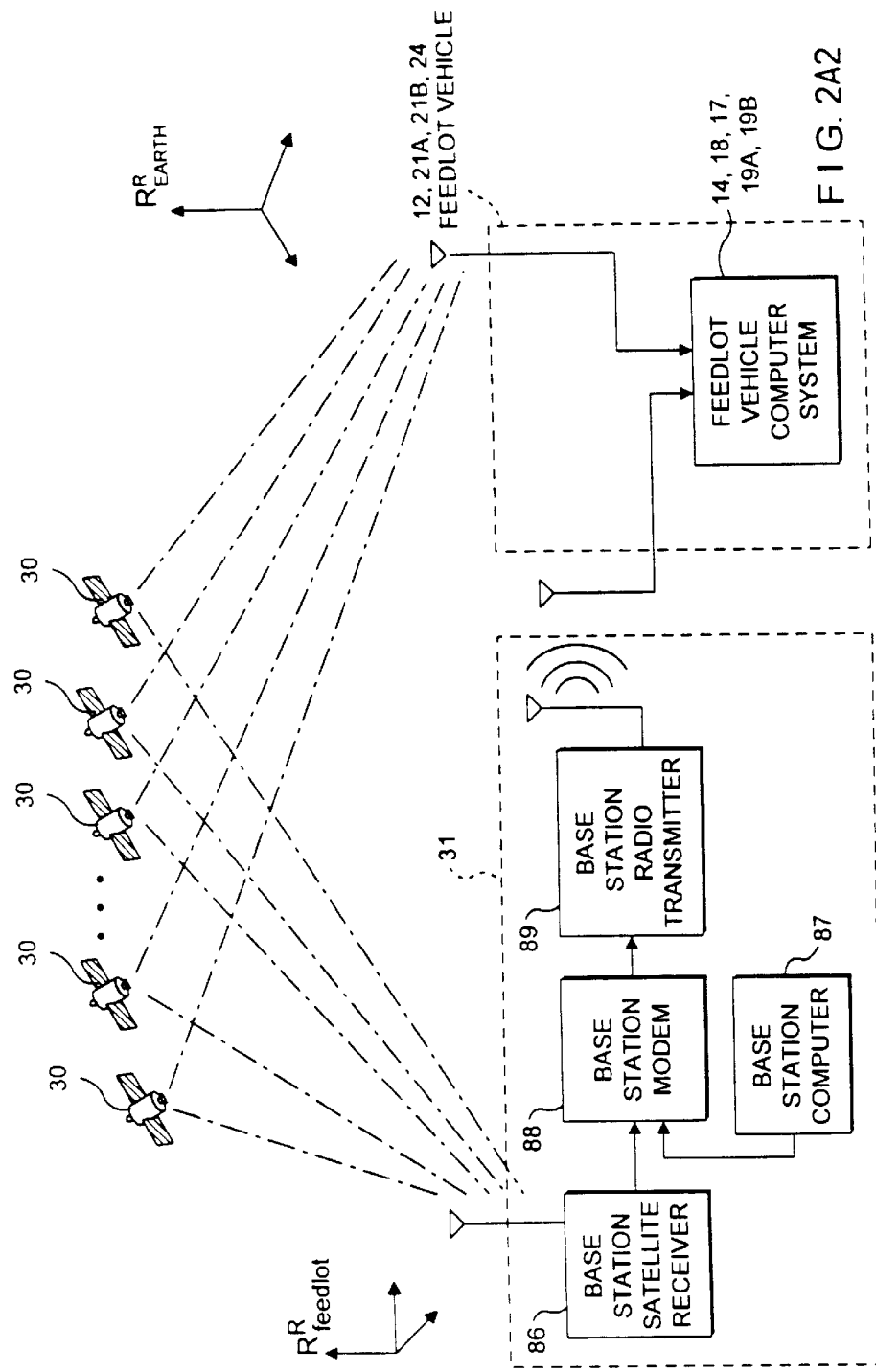

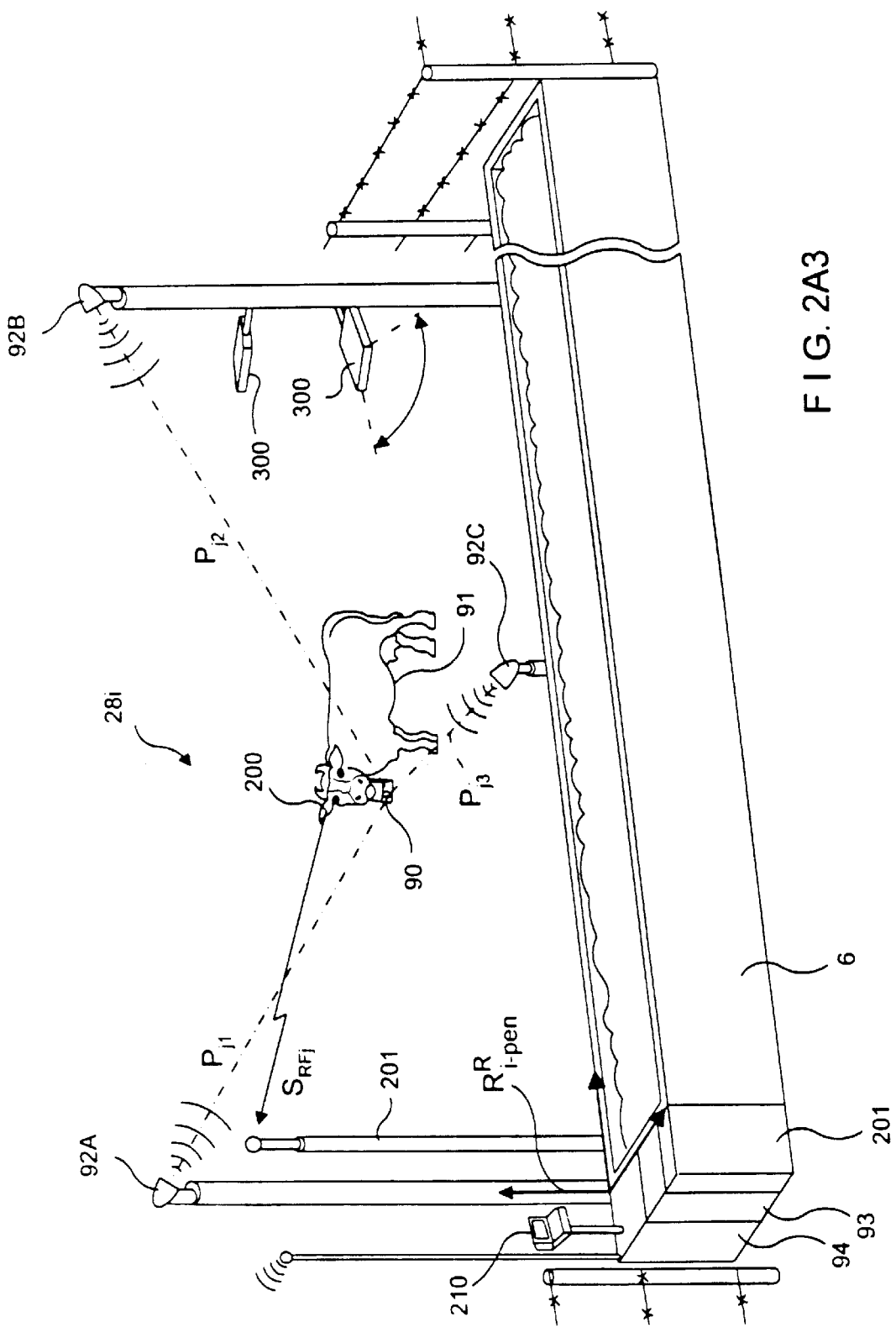
FIG. 2A3

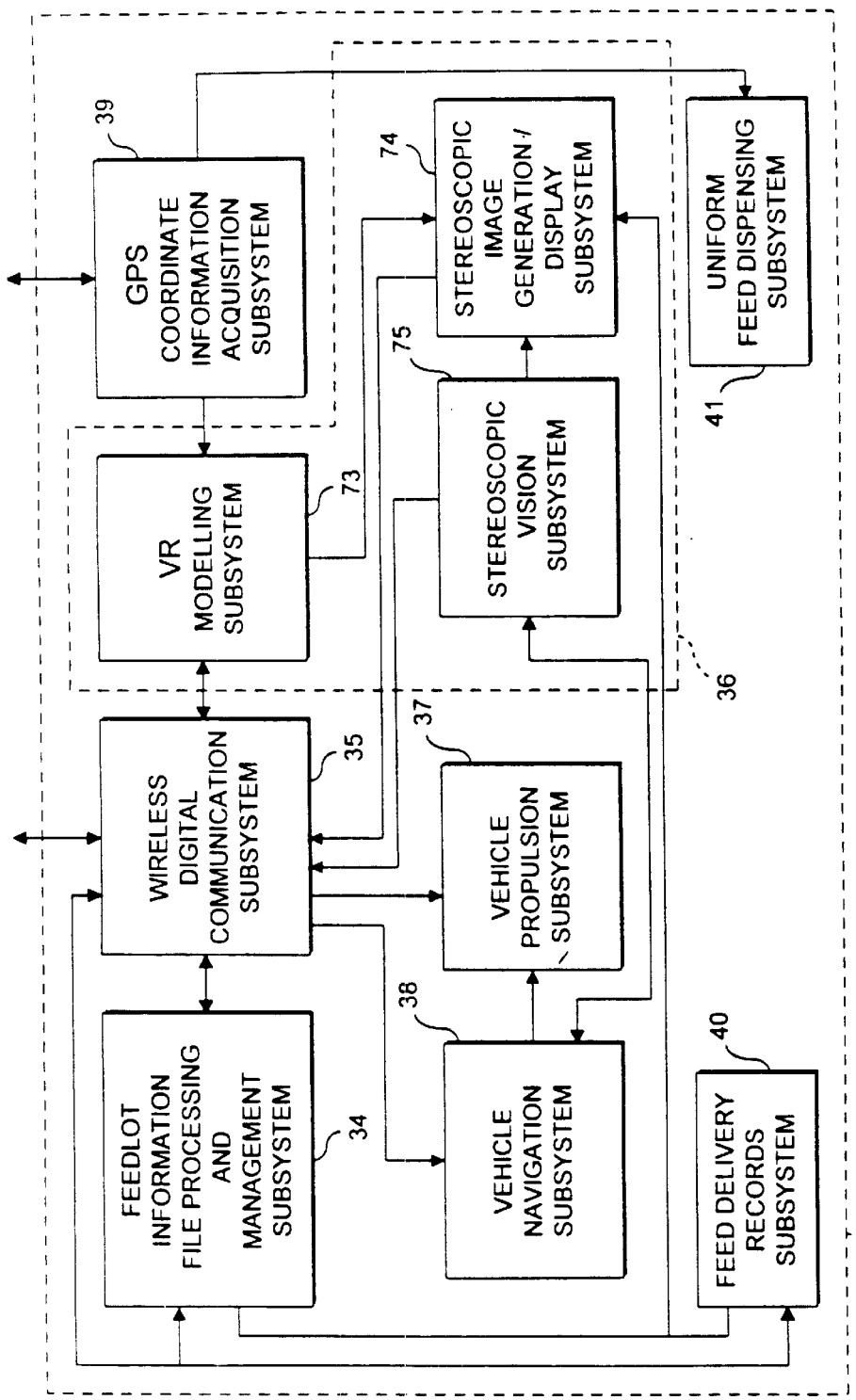
FIG. 2B1

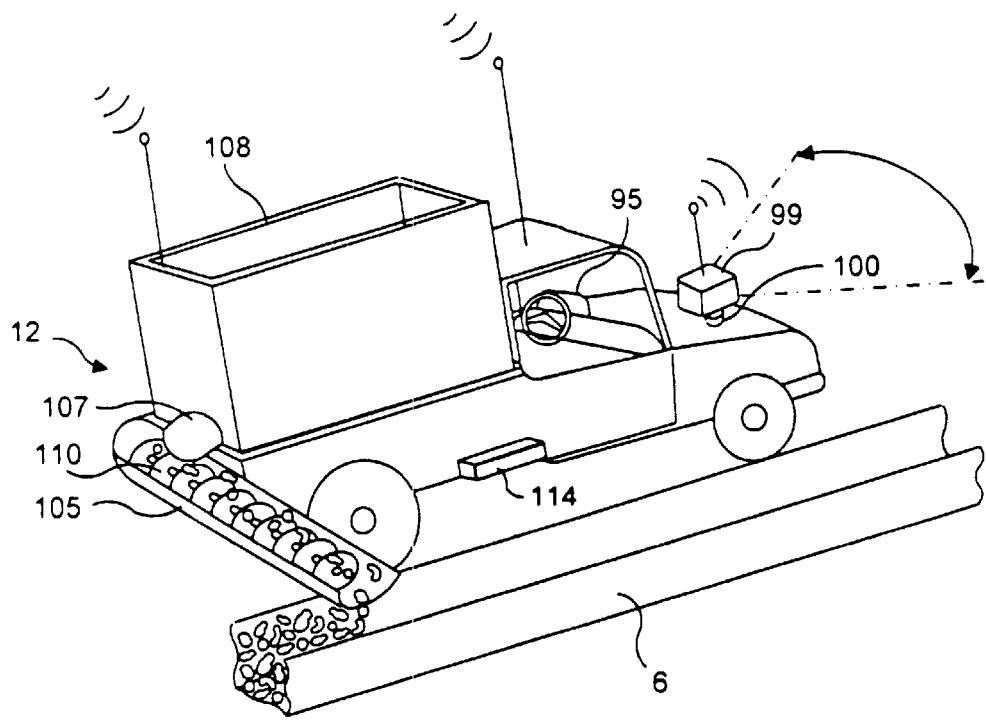
FIG. 2B2
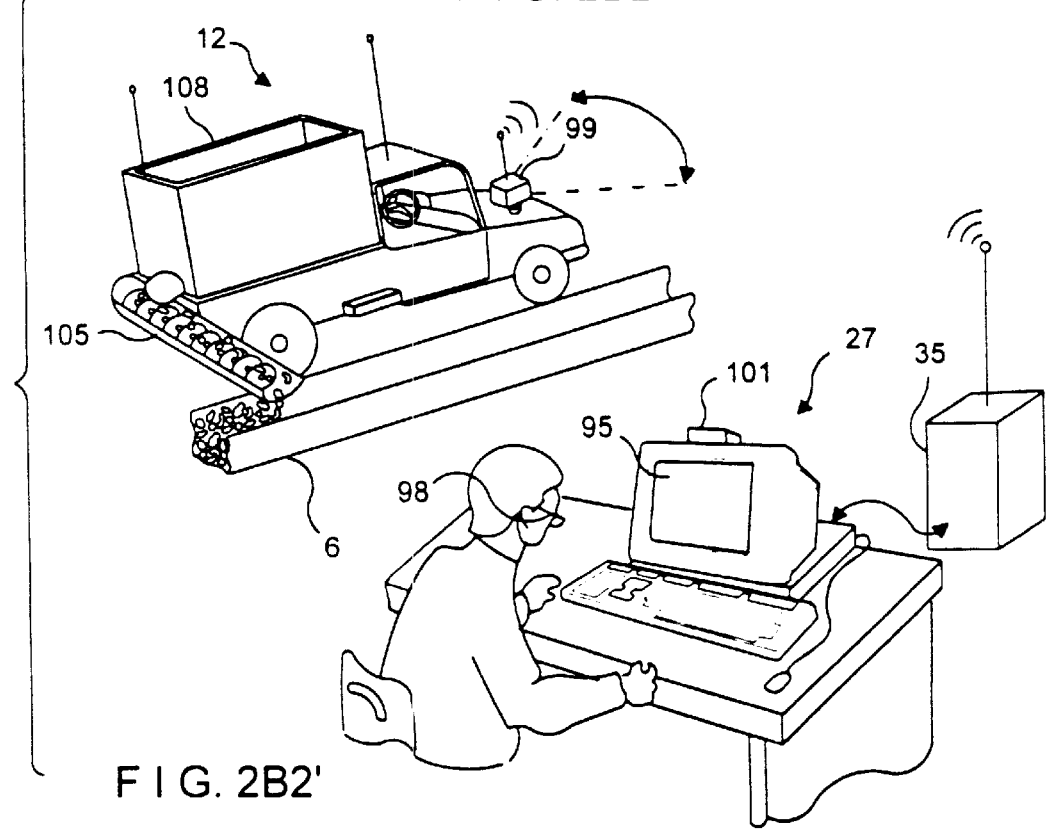
FIG. 2B2'

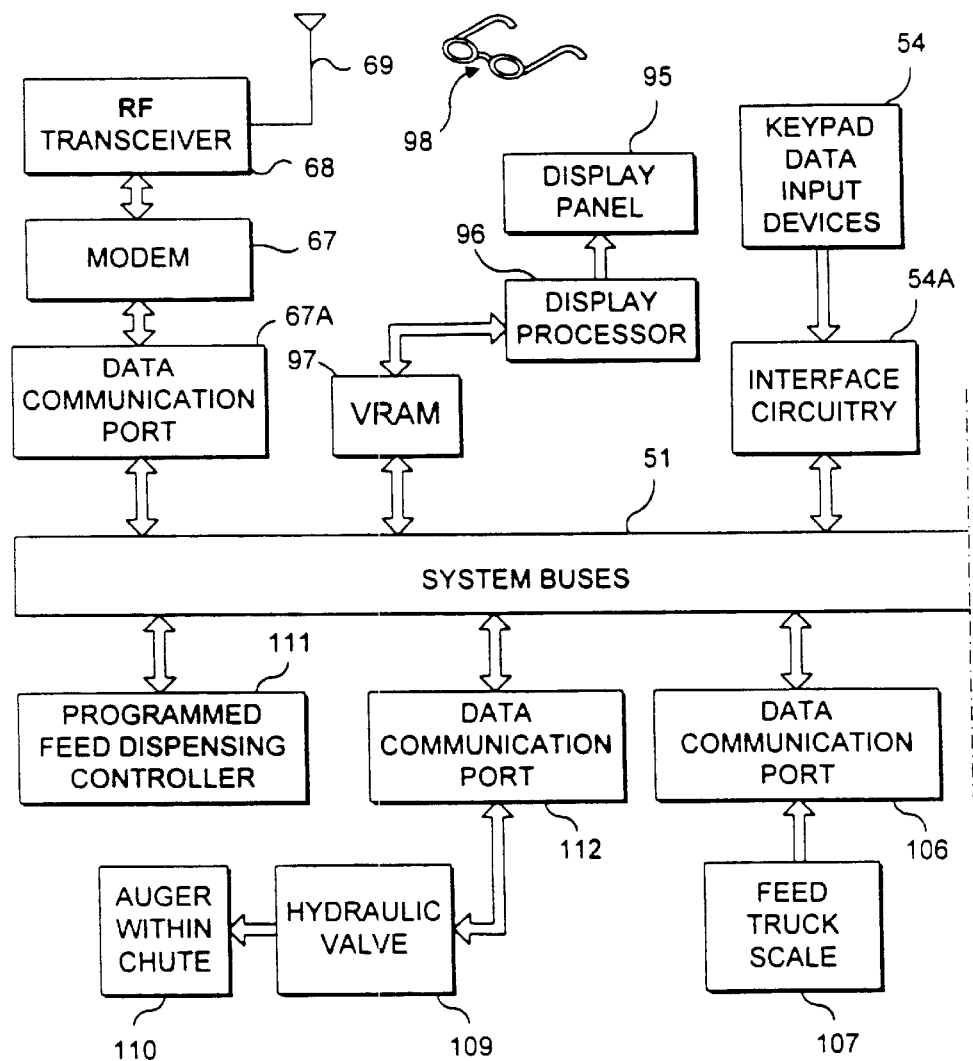
FIG. 2B3-1

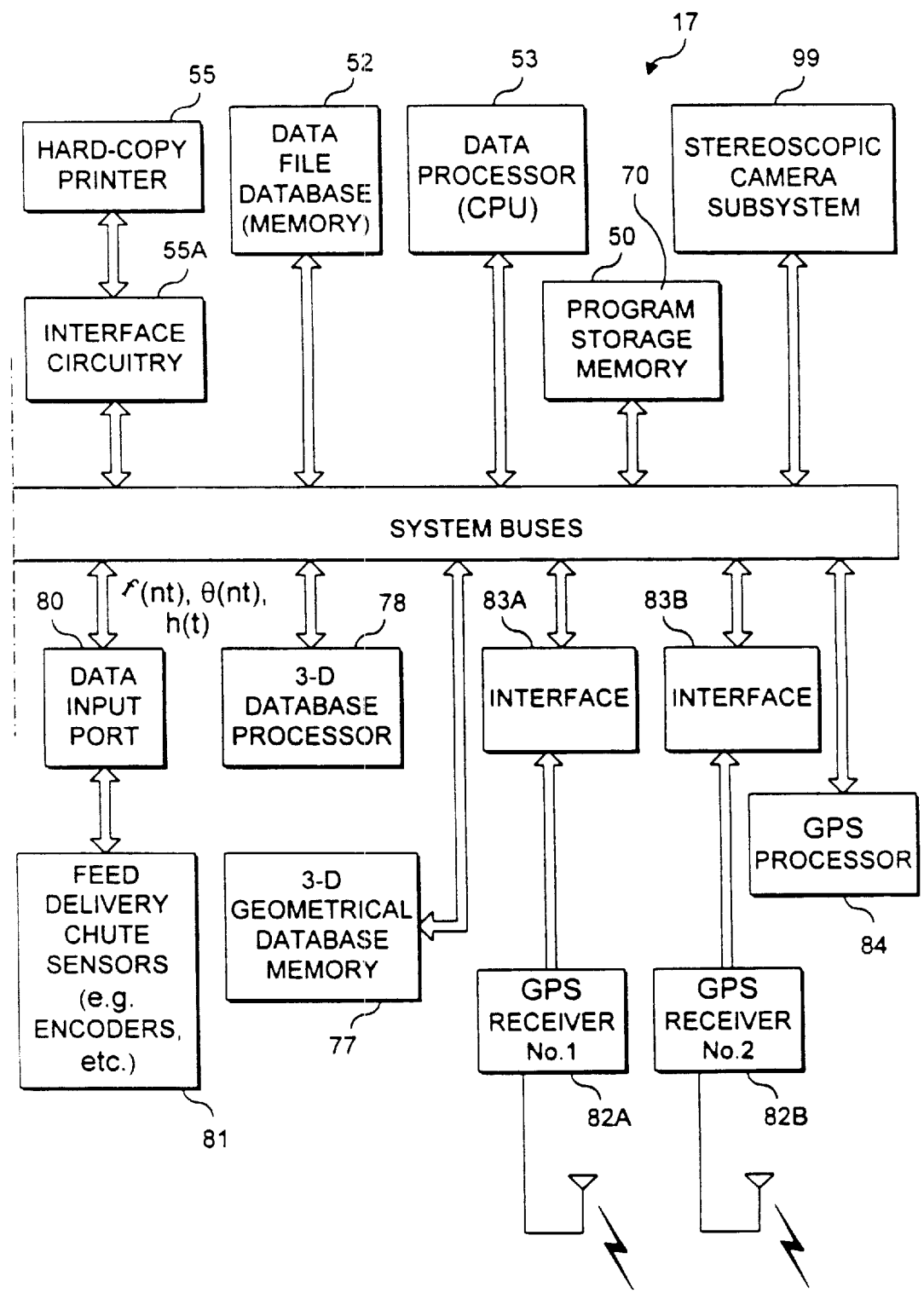
FIG. 2B3-2

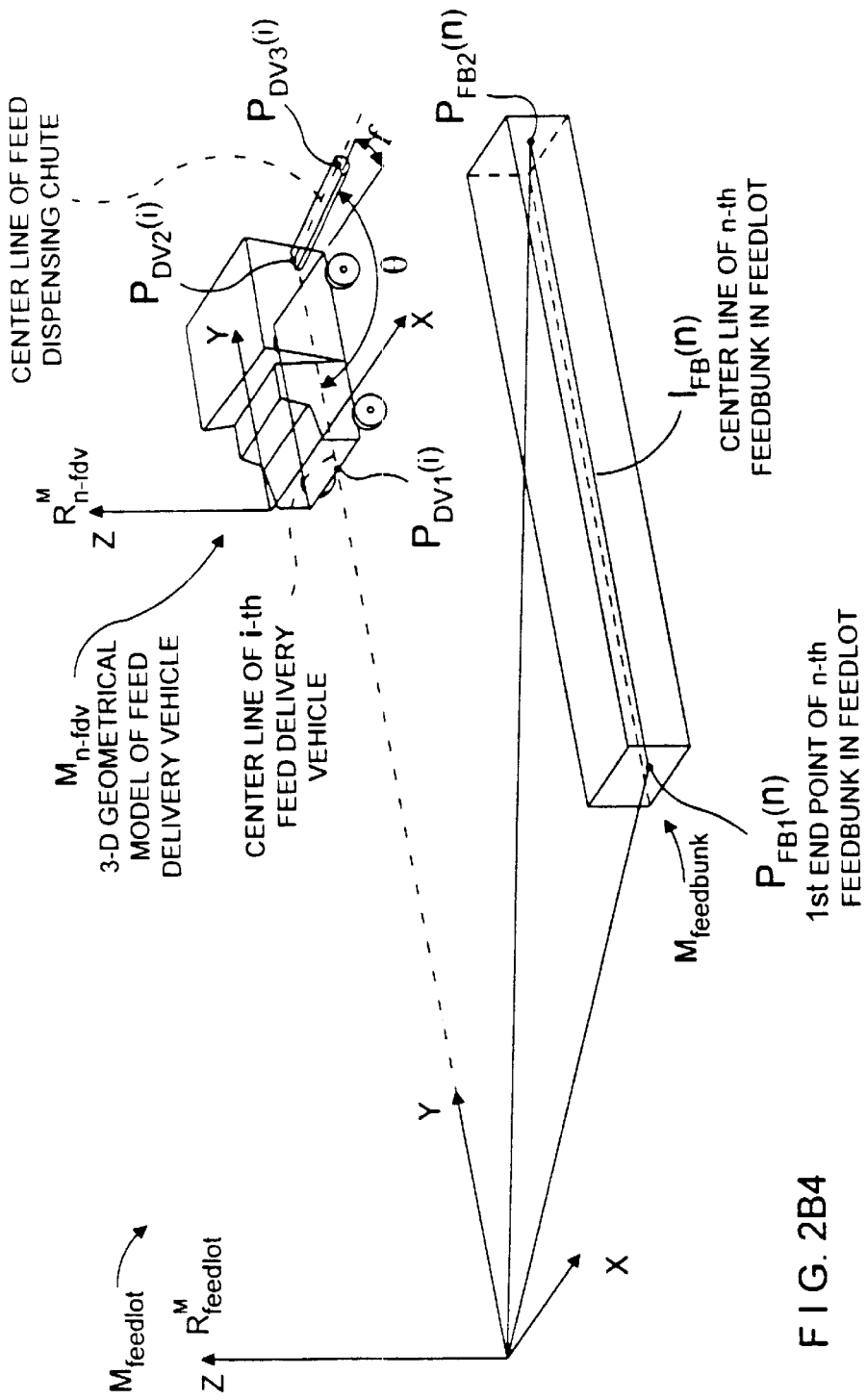
FIG. 2B4

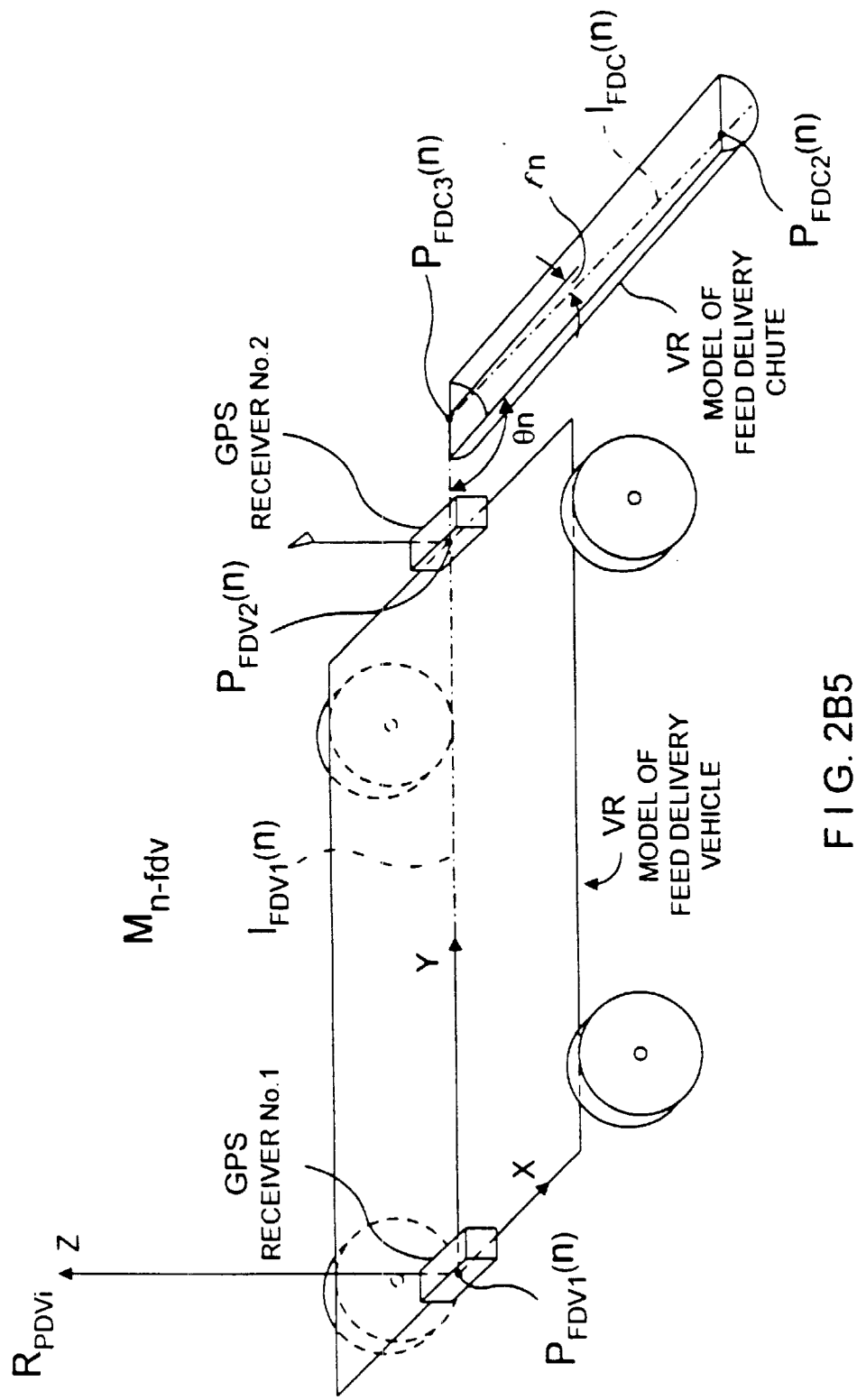
FIG. 2B5

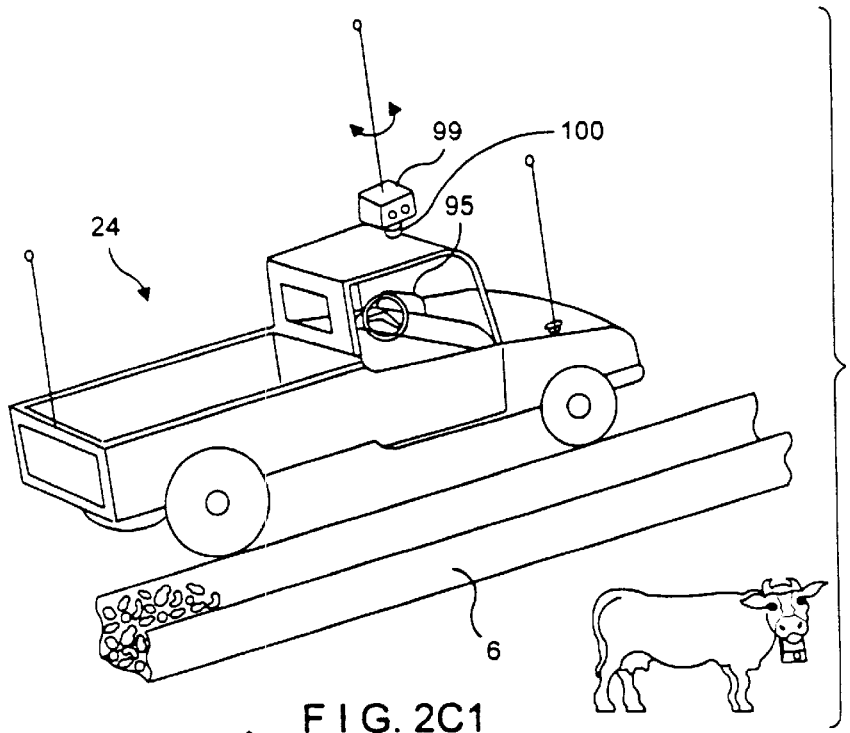
FIG. 2C1
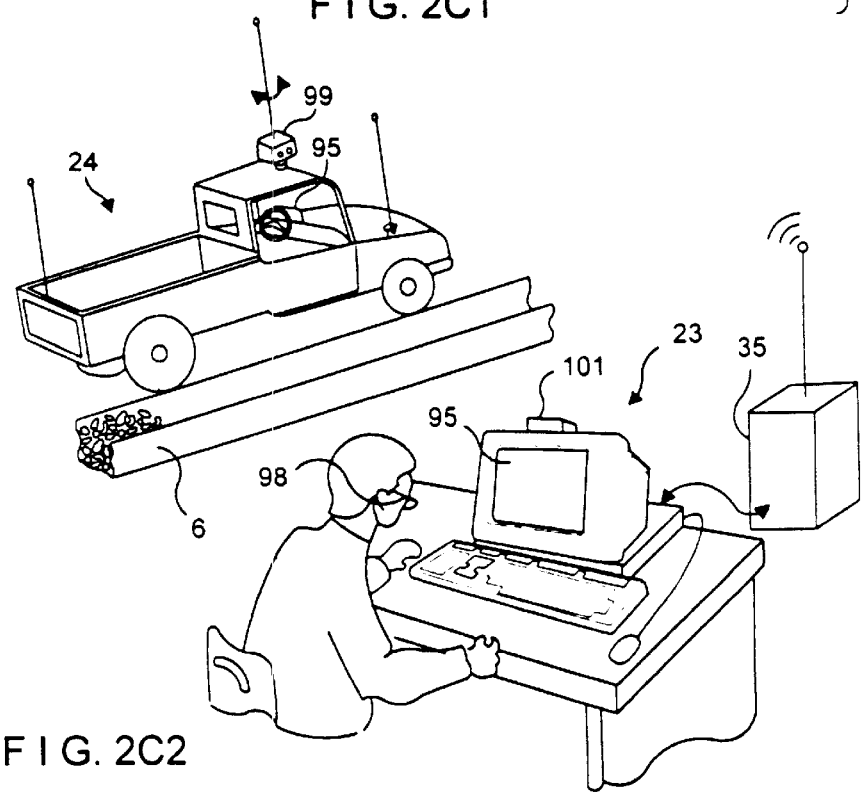
FIG. 2C2

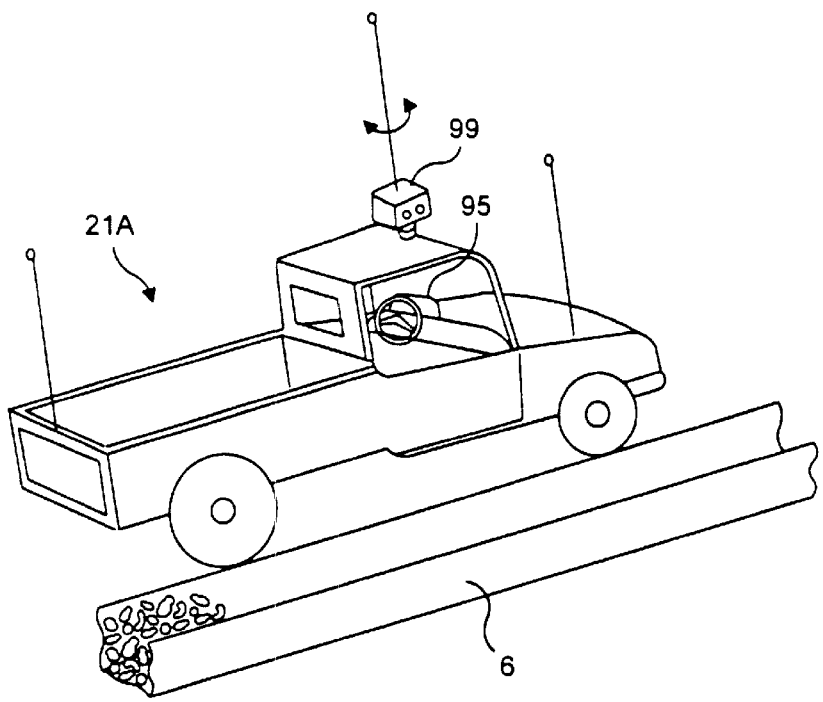
FIG. 2D1
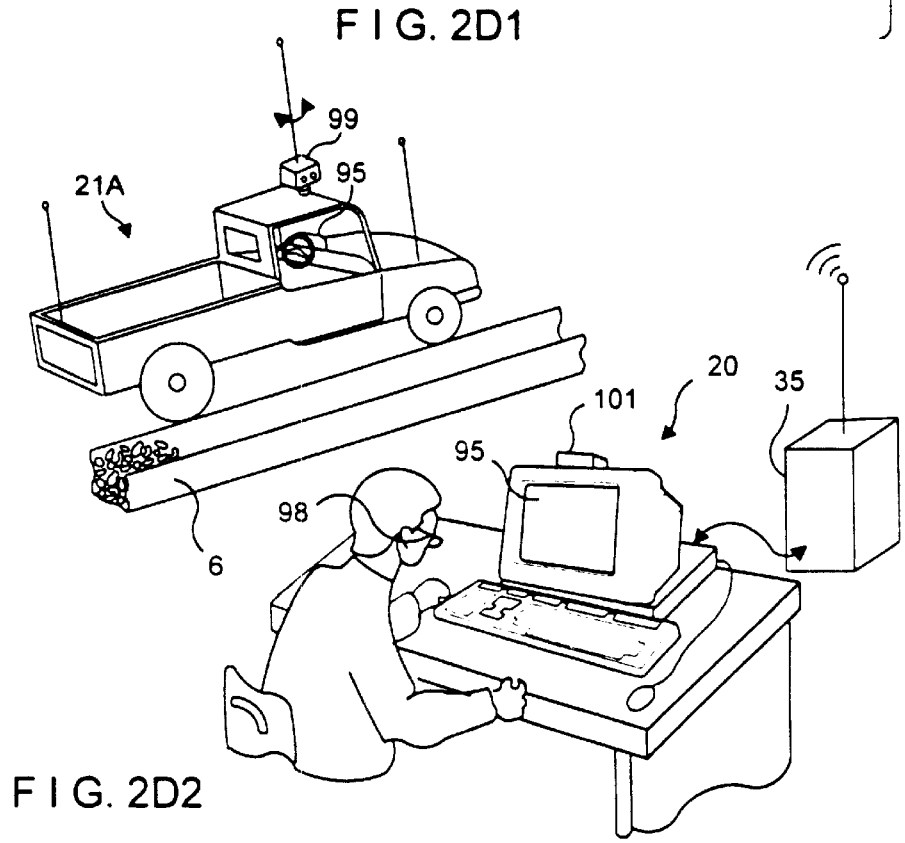
FIG. 2D2

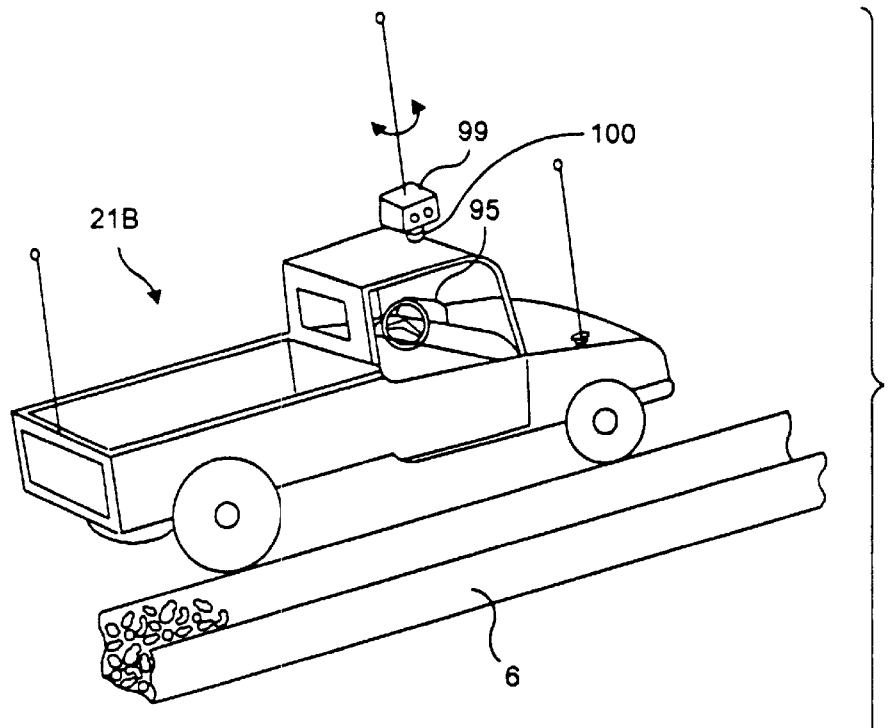
FIG. 2E1
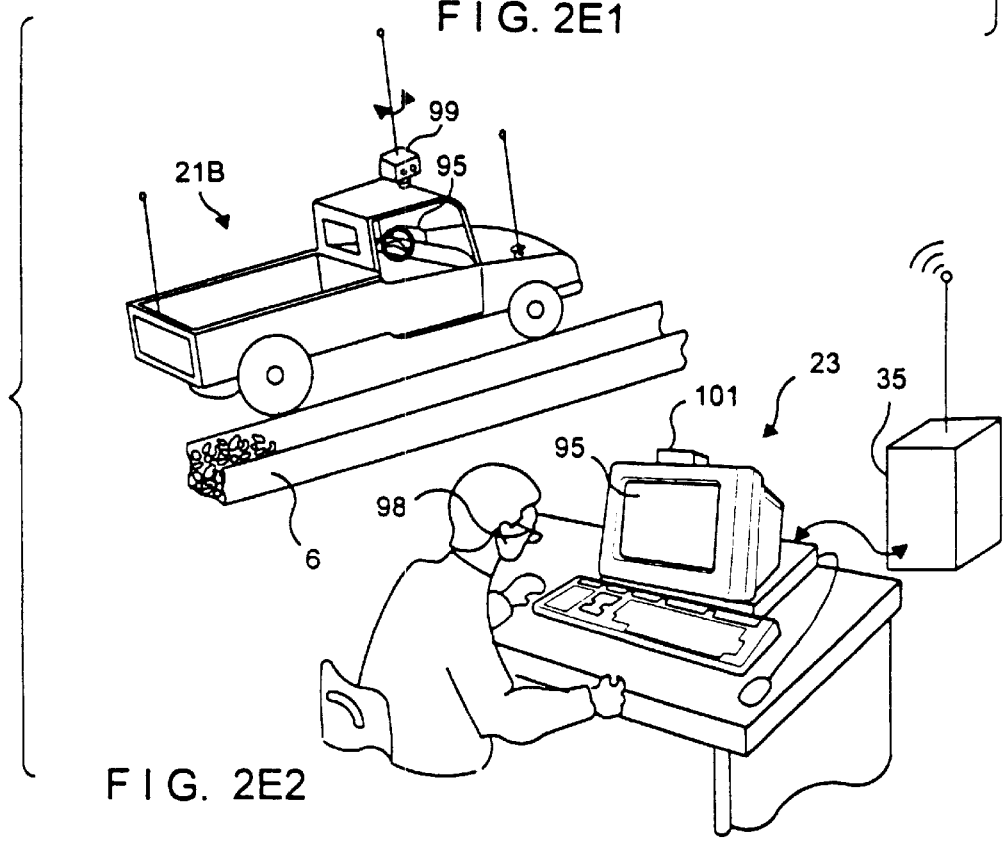
FIG. 2E2

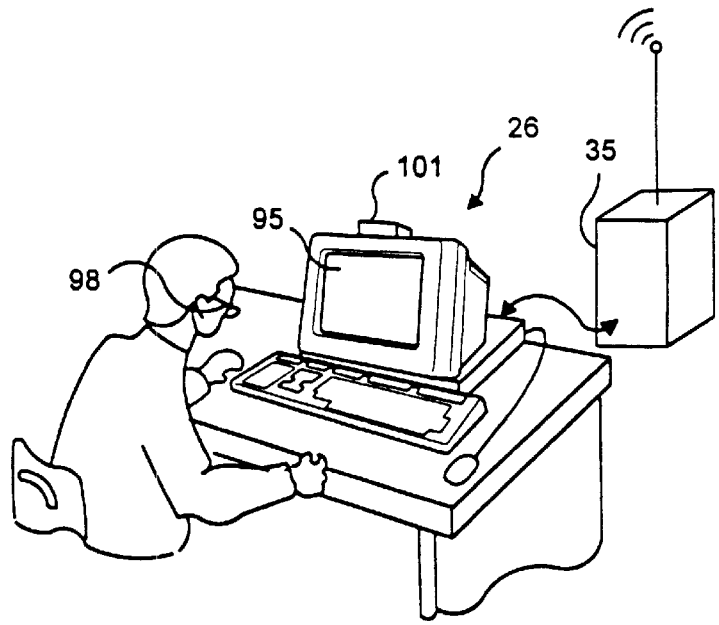
FIG. 2F1
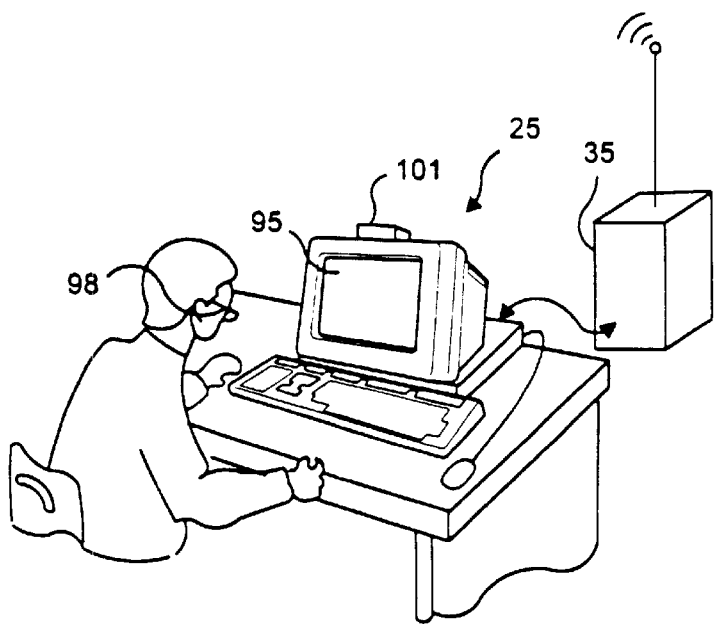
FIG. 2G1

APPARATUS AND METHOD FOR DELIVERING FEED RATIONS ALONG A FEEDBUNK USING A GLOBAL POSITIONING SYSTEM

RELATED CASES

This is a Continuation of patent application Ser. No. 09/044,648 filed Mar. 19, 1998, now U.S. Pat. No. 6,216,053, which is a continuation-in-part of Ser. No. 08/863,646 filed May 27, 1997, now U.S. Pat. No. 5,878,402, which is a continuation of Ser. No. 08/364,424 filed Dec. 27, 1994, which is now U.S. Pat. No. 5,636,118, which is a continuation of Ser. No. 08/248,390 filed May 24, 1994, now abandoned, which is a continuation of Ser. No. 07/973,450 filed Nov. 9, 1992, now abandoned.

FIELD OF INVENTION

The present invention relates to an improved system and method for delivering assigned feed rations to feedbunks associated with animal pens in a feedlot, in which discretion and direct control over the various suboperations of the feed ration assignment and delivery process are distributed among the individual operators in the system which the feedlot manager is capable of indirectly monitoring the performance of the various suboperations through use of a satellite-based global positioning system.

BACKGROUND

In modern times, commercial feedlots are used extensively to feed thousands of head of cattle or other animals at various stages of growth. The major reason for using an animal feedlot to feed cattle rather than the "open range", is to expedite the cattle growth process and thus be able to bring cattle to the market in a shorter time period.

Within an animal feedlot, cattle are physically contained in cattle pens, each of which has a feedbunk to receive feed. Ownership of cattle in the feedlot is defined by unique lot numbers associated with the group(s) of cattle in each pen. The number of cattle in an owner's lot can vary and may occupy a fraction of one or more cattle pens. Within a particular pen, cattle are fed the same feed ration, (i.e. the same type and quantity of feed). In order to accommodate cattle at various stages of growth or which require special feeding because they are sick, undernourished or the like, the feedlot comprises a large number of pens.

Generally, feeding cattle in a feedlot involves checking each pen daily to determine the ration quantity to be fed to the cattle therein at each particular feeding cycle during that day, the condition of the cattle, and the condition of the pen. At a feedmill, feed trucks are then loaded with appropriate quantities of feed for delivery during a particular feeding cycle. Thereafter, the loaded feed trucks are driven to the feedbunks and the assigned ration quantity for each pen is dispensed in its feedbunk. The above process is then repeated for each designated feeding cycle. Owing to the large number of feed ration quantities assigned for delivery each day in the feedlot, feeding animals in a large feedlot has become an enormously complex and time-consuming process.

It is well known in the art to use computers to simplify feedlot management operations. In their 1984 PC World article "Computers Ride The Range", Eric Brown and John Faulkner explain that large feedlots were the first cattle operations to utilize computers in order to simplify calculations on feed, cattle movements, payroll and accounting, invoicing and least-cost feed blending. From such calculations, market projections, "break-even prices" on any given head of cattle, and analyzable historical records can be easily created while permitting feedlot managers to keep track of virtually all overhead costs, from labor and equipment costs, down to the last bushel of corn or gram of micronutrients. Computer systems of the above type are generally described in the articles: "Homestead Management Systems' Feedlot Planner and Hay Planner" by Wayne Forest, published on pages 40–44 of the September 1985 issue of Agricomp magazine; and "Rations and Feedlot Monitoring" by Carl Alexander, published on pages 107–112 of Computer Applications in Feeding and Management of Animals, November 1984. The use of computer systems to simulate and thus predict the growth process of cattle in a feedlot is disclosed in the article "OSU Feedlot (Fortran)" by Donald R. Gill, on pages 93–106 of Computer Applications in Feeding and Management of Animals, supra.

It is also well known to use portable computing equipment in order to facilitate the assignment and delivery of feed rations in a feedlot. For example, U.S. Pat. No. 5,008,821 to Pratt, et al. discloses one prior art system in which portable computers are used in feed ration assignment and delivery operations. As disclosed, this prior art computer system uses portable computers during the feed ration assignment and delivery process. Using such computers, the feedbunk reader assigns particular feedtrucks and drivers to deliver specified loads of feed to specified sequences of pens along a prioritized feed route during each physical feeding cycle. Thereafter, the specified feed loads are loaded onto preassigned feed delivery vehicles, and then the feed delivery vehicles dispense the feed rations into the feedbunks associated with the corresponding animal pens along the prioritized feeding route.

In order to carry out feed delivery operations, known feed delivery vehicles use a motor-driven auger to dispense the preassigned amount of feed ration from the vehicle into and along the length of the corresponding feedbunk. However, when using conventional feed dispensing technology, non-uniform delivery of feed rations along the length of the feedbunk often occurs. As each section of the feedbunk naturally becomes the territory of a particular animal over time, certain animals, who return to the same section of the feedbunk during each feeding cycle, are not provided with an equal amount of feed as animals along the same feedbunk. This condition along the feedbunk prevents successful modelling of animal consumption patterns, and the prediction of weight gain in response to assigned feed rations, and thus significantly effects the overall feedlot management process sought to be carried out in the feedlot. Prior art feedlot management systems and methods not only fail to address this problem, but create conditions which perpetuate it.

Prior art feedlot management methods also fail to provide feedlot operators (e.g. bunkers, feed deliverymen, veterinarians and feedlot managers) with an easy way of ascertaining the state of affairs in the feedlot outside the scope and range of their human senses. Consequently, the use of prior art systems and methods has made it very difficult for operators to collaborate in ways which minimize the time and energy required to carry out feedlot operations, while reducing feedlot operating costs and the number of employees required to support its operations.

Thus, there is a great need in the art for an improved system and method for carrying out and managing animal feedlot operations, including delivering assigning feed rations to animals in a feedlot, while avoiding the shortcomings and drawbacks of prior art systems and methods.

OBJECTS OF THE PRESENT INVENTION

Accordingly, it is a primary object of the present invention to provide an improved method and apparatus for carrying out and managing animal feedlot operations, while overcoming the problems associated with prior art systems and methodologies.

A further object of the present invention is to provide such apparatus in the form of an animal feedlot operations and management system, wherein each feedlot vehicle employed therein has an on-board computer system which uses coordinate acquisition techniques supported by global (satellite-based) positioning system (GPS) in order to carry out and manage animal feedlot operations.

Another object of the present invention is to provide such apparatus in the form of an animal feedlot operations and management system, wherein each feedlot vehicle employed therein has an on-board computer system which uses real-time virtual reality (VR) modelling (e.g. 3-D geometrical) and coordinate acquisition techniques, supported on an Internet-based digital communications platform, in order to carry out and manage animal feedlot operations.

Yet another object of the present invention is to provide such a system, wherein each feed delivery vehicle employed therein has an on-board computer system which uses real-time VR modelling and coordinate acquisition techniques to uniformly deliver feed rations to the feedbunks of animals in the feedlot.

A further object of the present invention is to provide such a system, wherein a VR subsystem aboard each feedlot vehicle has access to a 3-D virtual reality modelling language (VRML) database containing a VR model of the feedlot which accurately reflects the position and orientation of the feedlot vehicles as it is navigated through the feedlot in either its manned or unmanned mode of navigation.

A further object of the present invention is to provide such a system, wherein the VRML database is continually updated by a VRML database processor (i.e. VRML engine) using information which has been obtained from a satellite-based global positioning subsystem and a plurality of local information acquisition subsystems (LIAS) integrated therewith and transmitted to the database processor by way of an Internet-based digital communications network.

A further object of the present invention is to provide such a system, in which information produced from the GPS is used to continually update the VR-based feedlot model in order to: (i) display alleyways, pens and other fixed identifiers in the feedlot on a display screen aboard each feedlot vehicle; (ii) determine that each particular feed delivery vehicle is stopped at the correct feedbunk for delivery of assigned feed rations; (iii) determine the length of the feedbunk at which the vehicle is stopped; and (iv) determine the speed of the feed delivery vehicle from the beginning of the feedbunk to the end thereof during uniform feed dispensing operations.

A further object of the present invention is to provide such a computer-assisted system, in which each feedlot vehicle includes at least two high-resolution GPS signal receivers and a GPS processor for producing coordinate data which specifies the position and orientation of the feedlot vehicle within the feedlot.

A further object of the present invention is to provide such a system, in which each feed delivery vehicle includes sensors for producing coordinate data specifying the orientation of the feed dispensing chute relative to the body of the feed delivery vehicle during uniform feed dispensing operations.

A further object of the present invention is to provide such a system, wherein each such feedlot vehicle can be remotely navigated over a preprogrammed or improvised navigational course in the feedlot by way of the vehicle operator interacting with a 3-D VR-world model of the feedlot stereoscopically viewed at remotely situated VR workstation in communication with the vehicle through a wireless digital communication network.

A further object of the present invention is to provide a feedlot computer network in which separate computer systems adapted for the feedbunk reader, the feedmill operator, the feedlot manager, the feedlot veterinarian, the feedlot nutritionist and the feed delivery vehicle operators are integrated within a wireless digital telecommunications network which, as part of the Internet, permits them to asynchronously transfer information files therewithin in order to carry out the feedlot modelling and management method of the present invention.

A further object of the present invention is to provide such a feedlot computer network, wherein the position and body-temperature of RF-tagged animals in the feedlot are reflected by the position and color of corresponding VR-based animal (sub)models in VR-based feedlot models maintained in the network.

A further object of the present invention is to provide a improved method of carrying out and managing operations in an animal feedlot.

SUMMARY OF THE PRESENT INVENTION

The animal feedlot management system of the present invention comprises a plurality of feedlot vehicles, a database for maintaining information representative of a model of the feedlot and objects contained therein, and a plurality of computer systems installed on-board the plurality of feedlot vehicles, each the computer system including a subsystem for viewing an aspect of the model maintained in the database, vehicle information acquisition means for acquiring vehicle information regarding (i) the position of the feedlot vehicle relative to a first prespecified coordinate reference frame, and/or (ii) the state of operation of the feedlot vehicle, and information transmission means for transmitting the vehicle information to the database to specify in the position and/or the state of operation of the feedlot vehicle represented within the model of the feedlot. The vehicle information acquisition means comprises a satellite-based global positioning system, and the database is periodically updated using the vehicle information obtained from the satellite-based global positioning system.

The animal feedlot management system further comprises animal information acquisition means for acquiring animal information regarding the position of animals in the feedlot relative to second prespecified coordinate reference frame, and/or the body-temperature of the animals so that the feedlot model reflects the position and/or body-temperature of the animals. The subsystem aboard each the feedlot vehicle comprises a stereoscopic display subsystem which permits the driver to stereoscopically view any aspect of the model, including the driver's vehicle as it is being navigated through the feedlot during feedlot operations.

Each feedlot vehicle can be remotely controlled through the feedlot by an operator using a remotely situated workstation, and each feedlot vehicle can be equipped with a corresponding stereoscopic vision subsystem having a field of view along the navigational course of the feedlot vehicle. The database can be maintained aboard an Internet server operably associated with an Internet-based digital communications network with which each the subsystem is in communication. In this case, a replica of the database is maintained aboard each feedlot vehicle.

The viewing subsystem can be used to ascertain both vehicle and animal information reflected in the model of the feedlot. The animal feedlot management system can further comprises at least one workstation for viewing the model of the feedlot during feedlot operations. This workstation can be used for viewing the model of a feedlot vehicle in the feedlot and remotely navigating the feedlot vehicle along a course in the feedlot.

In another aspect, the animal feedlot management system comprises a plurality of feedlot vehicles, each employing an on-board computer system which includes a feedlot modelling subsystem for maintaining a geometrical database containing a geometrical model of the feedlot and objects contained therein, a coordinate acquisition subsystem for acquiring coordinate information specifying the position of the feedlot vehicle relative to a coordinate reference system symbolically embedded within the feedlot, and geometrical database processor for processing information in the geometrical database using the coordinate information in order to update the geometrical model.

The associated method of animal feedlot management system for installation in an animal feedlot comprises the steps of (a) providing a feedlot vehicle with an on-board computer system which uses real-time VR modelling and coordinate acquisition techniques in order to maintain a 3-D geometrical model of the feedlot and objects therein including the feedlot vehicle, and (b) navigating the feedlot vehicle while viewing an aspect of the feedlot model from within the feedlot vehicle.

In a further aspect, the animal feedlot management system for installation in an animal feedlot pursuant to the present invention can comprise a virtual reality (VR) modelling subsystem for maintaining information representative of a VR model of the animal feedlot wherein the VR model accurately reflects the position of the feedlot vehicles as they are navigated through the feedlot, and the position and body-temperature of each the animal in the feedlot.

The animal feedlot management system for installation in an animal feedlot pursuant to the present invention can also comprise a feedlot vehicle; a virtual reality (VR) database for maintaining information representative of a VR model of the feedlot and objects contained therein including the feedlot vehicle and animals contained within the feedlot, and a computer system installed on-board the feedlot vehicle, and including a VR subsystem for viewing an aspect of the VR model maintained in the VR database.

The computer system can further comprise vehicle information acquisition means for acquiring vehicle information regarding the position of the feedlot vehicle relative to a prespecified coordinate reference frame and/or the state of operation of the feedlot vehicle, and information transmission means for transmitting the vehicle information to the VR database so as to specify the position and/or the state of the feedlot vehicle represented within the VR model of the feedlot. As the feedlot vehicle is navigated alongside a feedbunk in the feedlot, the VR subsystem permits the driver of the feedlot vehicle to view from a display panel within the feedlot vehicle, a selected portion of the VR model showing the feedlot vehicle and the feedbunk along which the feedlot vehicle is navigated during a feedlot operation.

The feedlot vehicle can further include a uniform feed dispensing subsystem for uniformly dispensing assigned feed rations along the length of a feedbunk, and the VR subsystem permits the driver of the feedlot vehicle to view from the display panel, a portion of the VR model showing the feedlot vehicle and the feedbunk along which the feedlot vehicle is navigated during uniform feed dispensing operations. These and other features will be readily apparent after having the benefit of the following disclosure and the appended figures which are described as follows.

BRIEF DESCRIPTION OF THE DRAWINGS

FIG. 2A1 is a block system diagram of the illustrative embodiment of the feedlot computer network of the present invention, showing the $1^{st}$ feed delivery computer system, the $n^{th}$ feed delivery computer system, the feedmill computer system, the feedlot management computer system, the feedbunk reading computer system, the veterinary computer system, the nutritionist computer system, the VR workstation for the veterinary vehicle, the VR workstation for the nutrition vehicle, the VR workstation for the feedbunk reading vehicle, the VR workstation for the feedlot manager at the central office (or feedmill), the VR workstation for the feedmill operator, the VR workstation for the $n^{th}$ feed delivery vehicle, the local positioning subsystem (LIAS) for the (i=1) animal pen, the LIAS for the $n^{th}$ animal pen, the satellites of the global positioning system (GPS), the GPS base station, and the Internet-based digital communications network for wireless mobile communications among the computer systems of the feedlot computer network.

FIG. 2A2 is a system block diagram illustrating the subcomponents of the GPS base station in relation to the GPS satellites and an exemplary feedlot vehicle computer of the present invention.

FIG. 2A3 is a schematic diagram showing the local information acquisition subsystem (LIAS) installed at the $i^{th}$ animal pen in the feedlot, for acquiring coordinate information specifying the body-temperature and position of each RF-tagged animal and trans-mitting such information to each VR subsystem in the computer network in order to continuously update the position and the temperature-coded color of such RF tagged animals within the VR-based feedlot model maintained within the system of the present invention.

FIG. 2B1 is a system block diagram of the computer system aboard each feed delivery vehicle of the present invention.

FIG. 2B2 is a schematic representation of the $n^{th}$ feed delivery vehicle of the present invention shown operating in its "manned-navigation" mode of operation with the human operator using its on-board VR subsystem while navigating the vehicle alongside a feedbunk being uniformly filled with an assigned amount of feed ration.

FIG. 2B2' is a schematic representation of the $n^{th}$ feed delivery vehicle of the present invention shown operating in its "unmanned-navigation" mode of operation with a human operator sitting before its remote-situated VR workstation and remotely navigating the vehicle along a preplotted navigational course passing along a feedbunk being uniformly filled with an assigned amount of feed ration.

FIG. 2B3 is a schematic system diagram of the computer system aboard the $n^{th}$ feed delivery vehicle, showing the components used to realize the subsystems thereof.

FIG. 2B4 is a geometrical representation of a 3-D VR model of a portion of an animal feedlot (i.e. VR-based feedlot model), showing one of its pens, a feedbunk and a feed delivery vehicle, originally created in the centralized VR workstation and thereafter maintained and updated within each of the VR subsystems in the feedlot computer network.

FIG. 2B5 is a geometrical representation of a 3-D VR-based model of the $n^{th}$ feed delivery vehicle, maintained within each VR subsystem of the first illustrative embodiment, in which a local coordinate reference system (i.e. coordinate reference frame) is symbolically embedded therein, and submodels of its front and rear GPS receivers are shown mounted along the centerline $l_{FDV}(n)$ of the vehicle at endpoints $P_{FDV1}(n)$ and $P_{FDV2}(n)$, respectively, and its feed delivery chute is shown pivotally mounted about a pivot point $P_{FDV}(n)$ located along the vehicle's centerline $l_{FDV}(n)$.

FIG. 2C1 is a schematic representation of the feed delivery vehicle of the present invention shown operating in its "manned-navigation" mode of operation with a human operator using its on-board VR subsystem while navigating the vehicle alongside a feedbunk being uniformly filled with an assigned amount of feed ration.

FIG. 2C2 is a schematic representation of the feed delivery vehicle of the present invention shown operating in its "unmanned-navigation" mode of operation with a human operator sitting before its remote-situated VR subsystem and remotely navigating the vehicle along a preplotted navigational course passing along a feedbunk being uniformly filled with an assigned amount of feed ration.

FIG. 2D1 is a schematic representation of the feedlot veterinary vehicle of the present invention shown operating in its "manned-navigation" mode of operation with the veterinarian using its on-board VR subsystem while navigating the vehicle alongside a feedbunk containing animals being visually inspected.

FIG. 2D2 is a schematic representation of the feed delivery vehicle of the present invention shown operating in its "unmanned-navigation" mode of operation with a veterinarian sitting before its remote-situated VR subsystem and remotely navigating the vehicle along a preplotted navigational course passing along a feedbunk containing animals being visually inspected by its on-board stereoscopic vision system.

FIG. 2E1 is a schematic representation of the feedlot nutrition vehicle of the present invention shown operating in its "manned-navigation" mode of operation with a nutritionist using its on-board VR subsystem while navigating the vehicle alongside a feedbunk containing animals being visually inspected by its on-board stereoscopic vision system.

FIG. 2E2 is a schematic representation of the feed delivery vehicle of the present invention shown operating in its "unmanned-navigation" mode of operation with a nutritionist sitting before its remote-situated VR subsystem and remotely navigating the vehicle along a preplotted navigational course passing along a feedbunk containing animals being visually inspected by its on-board stereoscopic vision system.

FIG. 2F1 is a schematic representation of the feedmill computer system of the present invention showing a human operator sitting before its remote-situated VR subsystem during typical feedlot management operations within the feedmill.

FIG. 2G1 is schematic representation of the feedlot computer system of the present invention showing a human operator sitting before its remotely-situated VR subsystem during typical feedlot management operation within the central office.

FIG. 3 is a system block diagram illustrating the subsystem components of a feedlot vehicle computer system of the second illustrative embodiment of the feedlot computer system shown in FIGS. 1 and 2 of the present invention.

DETAILED DESCRIPTION OF THE INVENTION

According to a first aspect of the present invention, a system is provided for carrying out and managing operations within an animal feedlot, in which each feed delivery vehicle employed therein uses real-time VR modelling and coordinate acquisition techniques to carry out and manage various types of feedlot operations, including bunkreading, feed dispensing, and the delivering of animal health and nutritional care in the feedlot.

In the first illustrative embodiment, each feedlot vehicle has an on-board computer system which includes a VR subsystem that is in communication with an Internet-based digital communications network that supports real-time multi-media information transfer. Each VR subsystem provides access to a 3-D geometrical database (e.g. represented in VRML) storing information representative of a VR-based model of the feedlot as well as animate objects (e.g. tagged animals) and inanimate objects (e.g. pens, alley ways, feedbunks, buildings, vehicles etc.) present therein. The VRML database is continually updated by a VRML database processor which uses information obtained from each feedlot computer system, a satellite-based global positioning system (GPS), as well as a local information acquisition subsystems (LIAS) integrated therewith. The primary function of each LIAS is to acquire information pertaining to the position and body-temperature of RF-tagged animals in the feedlot, for use in maintaining the VR feedlot model. The VR subsystem aboard each feedlot vehicle includes an image display subsystem which permits the driver to stereoscopically view any aspect of the VR feedlot model, including the driver's vehicle as it is being operated and navigated through the feedlot during feedlot operations. The VR subsystem aboard each feedlot vehicle can be used by feedbunk readers, feed deliverymen, veterinarians, nutritionists, feedmill operators, and feedlot managers alike.

In an alternative embodiment of the animal feedlot system, each feedlot vehicle can be remotely navigated through the feedlot by an operator who sits before a VR workstation. The VR workstation allows the operator to remotely navigate the vehicle through the feedlot using a VR-interface equipped with a stereoscopic vision subsystem having a field of view along the navigational course of the remotely controlled vehicle. A single operator can remotely navigate one or more feedlot vehicles simultaneously. The navigational courses of these remotely navigated vehicles can be preprogrammed in an orchestrated manner to avoid collisions and optimize the time and energy required to carry out feedlot operations, while reducing the operating costs of the feedlot as well as the number of employees required to support its operations.

Figure 1:
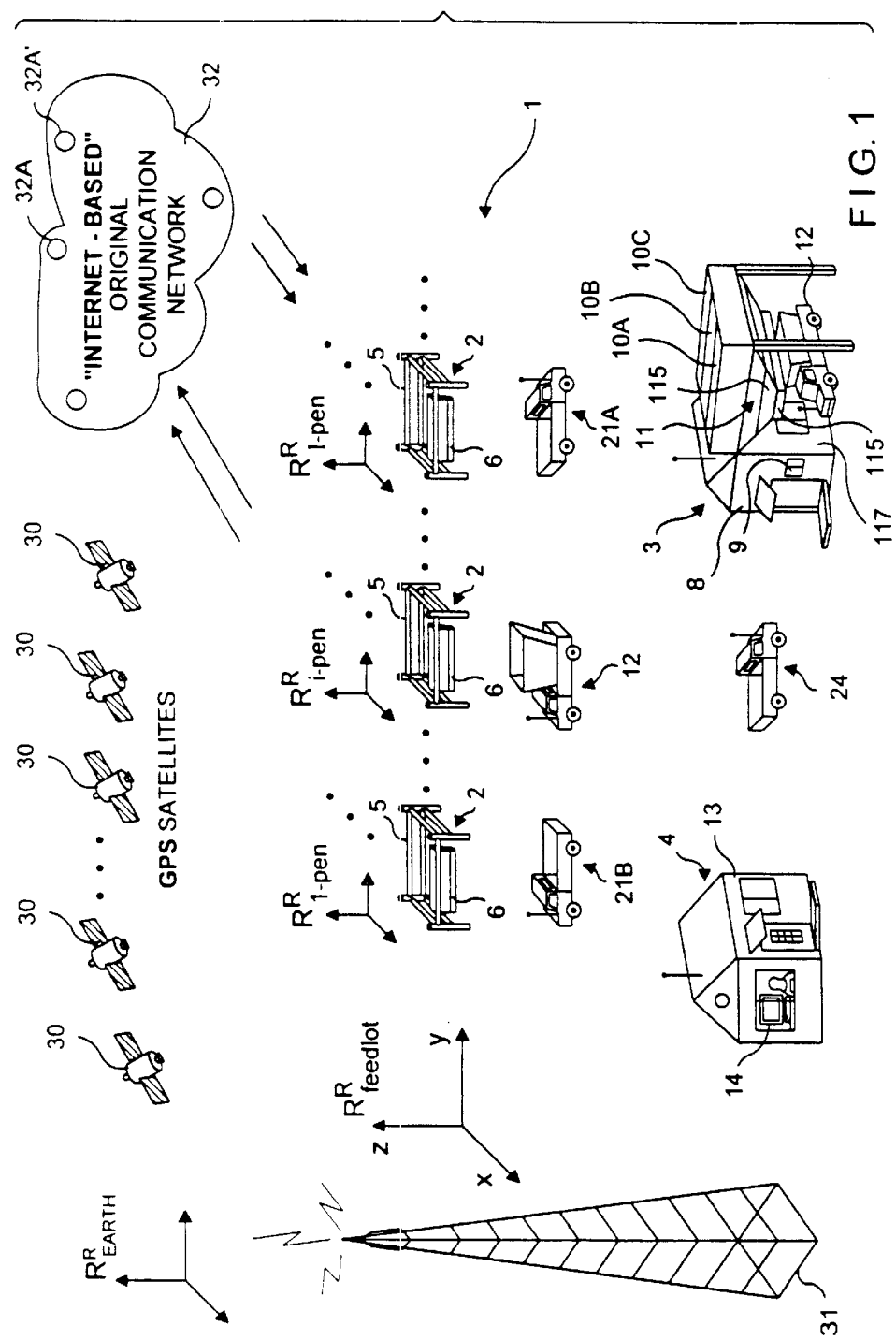
FIG. 1 is a schematic representation of a feedlot within which the feedlot computer network of the present invention is installed in order to practice the system and method of the present invention.

Referring to FIG. 1 of the Drawings, there is shown an exemplary feedlot 1 comprising several cattle pens 2, a feedmill 3 and a base office (i.e. central office) 4. Typically, each cattle pen 2 comprises fencing 5 and an associated feedbunk 6 capable of holding a feed ration, (i.e. an amount and type of feed ration). The length of each feedbunk will vary from feedlot to feedlot and typically has a length commensurate with the length of each animal pen.

Feedmill 3 typically comprises an enclosed building structure 8 for housing office furniture and a feedmill computer system 9 programmed for (i) assigning feed loads and pen subsequences and (ii) controlling various feedmill operations, the nature of which is well known in the art. At the feedmill, elevated storage bins 10A, 10B and 10C, and feed ingredient mixing/metering equipment 11 operably associated with the feedmill computer system 9, are provided so that a specified feed load (i.e. comprising one or more feed batches) can be milled and mixed (i.e. prepared) and then loaded onto a feed delivery vehicle 12 in a manner known in the art. Base office 4 typically comprises an enclosed building structure 13 for housing office furniture, a feedlot management computer system 14 and a feedlot financial accounting/billing subsystem 15B associated therewith, the nature of which will be described in greater detail hereinafter. Within this building, the manager of the feedlot (hereinafter "the feedlot manager") typically maintains an office along with personal involved in financial accounting and billing operations, as well as animal nutrition and health care.

The feedlot operations and management system of the present invention includes a feedlot computer network 16 which is shown embodied within the exemplary feedlot of FIG. 1. As shown in FIG. 2, the feedlot computer network 16 comprises: a plurality of feed delivery (vehicle) computer systems 17, each installed aboard a plurality feed delivery vehicles 12; feedmill computer system 9 installed at feedmill 3; feedlot management computer system 14 installed at base office 4; feedbunk reading computer system 18 installed aboard a feedlot vehicle 24; veterinarian computer system 19A installed aboard a feedlot vehicle 21A; a nutritionist computer system 19B installed aboard a feedlot vehicle 21B; VR workstation 20 at central office 4 for remote navigation of veterinary vehicle 21A and VR-based operations management; VR workstation 22 at central office 4 for remote navigation of the nutrition vehicle 21B and VR-based operations management; VR workstation 23 at central office 4 for remote navigation of feedbunk reading vehicle 24 and VR-based operations management; VR workstation 25 at central office 4 for the feedlot manager; VR workstation 26 at feedmill 3 for the feedmill operator; VR workstation 27 at feedmill 3 for the n$^{th}$ feed delivery vehicle 12; a local positioning subsystem (LIAS) 28 for the i=1) animal pen; LIAS for the i$^{th}$ animal pen; a plurality of GPS satellites 30 for the global positioning system (GPS); a GPS base station 31; and the Internet-based digital communications network 32 for wireless mobile communications among the computer system of the feedlot computer network. While the preferred configuration for the feedlot computer network is illustrated in FIG. 2, it is understood, however, that alternative configurations for the computer network may be adopted without departing from the scope and spirit of the present invention.

As illustrated in FIG. 1, the "feedbunk reader" collects data relevant to feedbunk management operations by driving feedlot vehicle similar to the bunkreading vehicle 24, the veterinary vehicle 21A or nutritionist vehicle 21B, to the animal pens where a head of cattle are confined for feeding and/or veterinary care. In most larger feedlot operations, the feedbunk reader, or like person carrying out his responsibilities, has one primary function: to assign specific types and amounts of feed (hereinafter "feed rations") to be delivered to each pen and dispensed within the feedbunk associated therewith during the designated feeding cycles executed within a given day. The type and total amount of feed ration assigned per head of cattle will depend on a number of factors, including the particular stage of growth of the cattle. Typically, the number of feeding cycles scheduled by the feedlot manager in a given day will range from one to four or more.

The primary functions of the feedlot manager, on the other hand, are to maintain daily records on the following items: (i) cattle held in each pen; (ii) the ingredients/formulation of the feed rations; (iii) the feed ration consumption history of the cattle over a period of time; (iv) the identity of each driver of a feed delivery vehicle; (v) the identification and description of feed ration delivery vehicles within the pens in the feedlot; and (vi) the charges to be billed to cattle owners for the feed rations delivered to their cattle. It is understood, however, that these functions may be allocated differently from one feedlot to the next.

The primary function of the feed deliverymen is to deliver assigned feed rations to a prioritized (sub)sequence of animal pens in the feedlot. The primary function of the veterinarian is to diagnose and treat sick animals with prescribed medication and nutrients. In certain feedlots, a nutritionist may be employed for the purpose of ensuring that the nutritional requirements of the animals are being satisfied.

As shown FIGS. 2B1, 2C, 2D, 2E, 2F and 2G, each feedlot computer system 9, 14, 17, 18, 19A and 19B within the computer network of FIG. 2 has a similar architecture which comprises an integration of the following subsystems: an information file processing and management subsystem 34; a wireless digital data communication subsystem 35; and a VR subsystem 36. In addition, each feedlot computer system 9, 14, 17, 18, 19A and 19B is provided with a remotely situated VR workstation 26, 25, 27, 23, 20 and 21, respectively. If the feedlot computer system is installed aboard a feedlot vehicle, then the feedlot computer system will include a number of additional subsystems corresponding to the functions to be provided at the vehicle. Similarly, if the feedlot computer system is installed within a feedlot building (e.g. central office or feedmill), then the computer system will include a number of additional subsystems corresponding to the functions to be provided within or about these buildings.

As shown in FIG. 2B1, the additional subsystems aboard the feed delivery vehicle hereof include: a vehicle propulsion subsystem 37; a vehicle navigation subsystem 38; a GPS-based coordinate information acquisition subsystem 39; a feed delivery records subsystem 40 and an uniform feed dispensing subsystem 41. These additional subsystems are integrated with the other subsystems aboard the feed delivery vehicle to provide what can be viewed as single resultant system having a number of different modes of system operation.

Figure 2C:
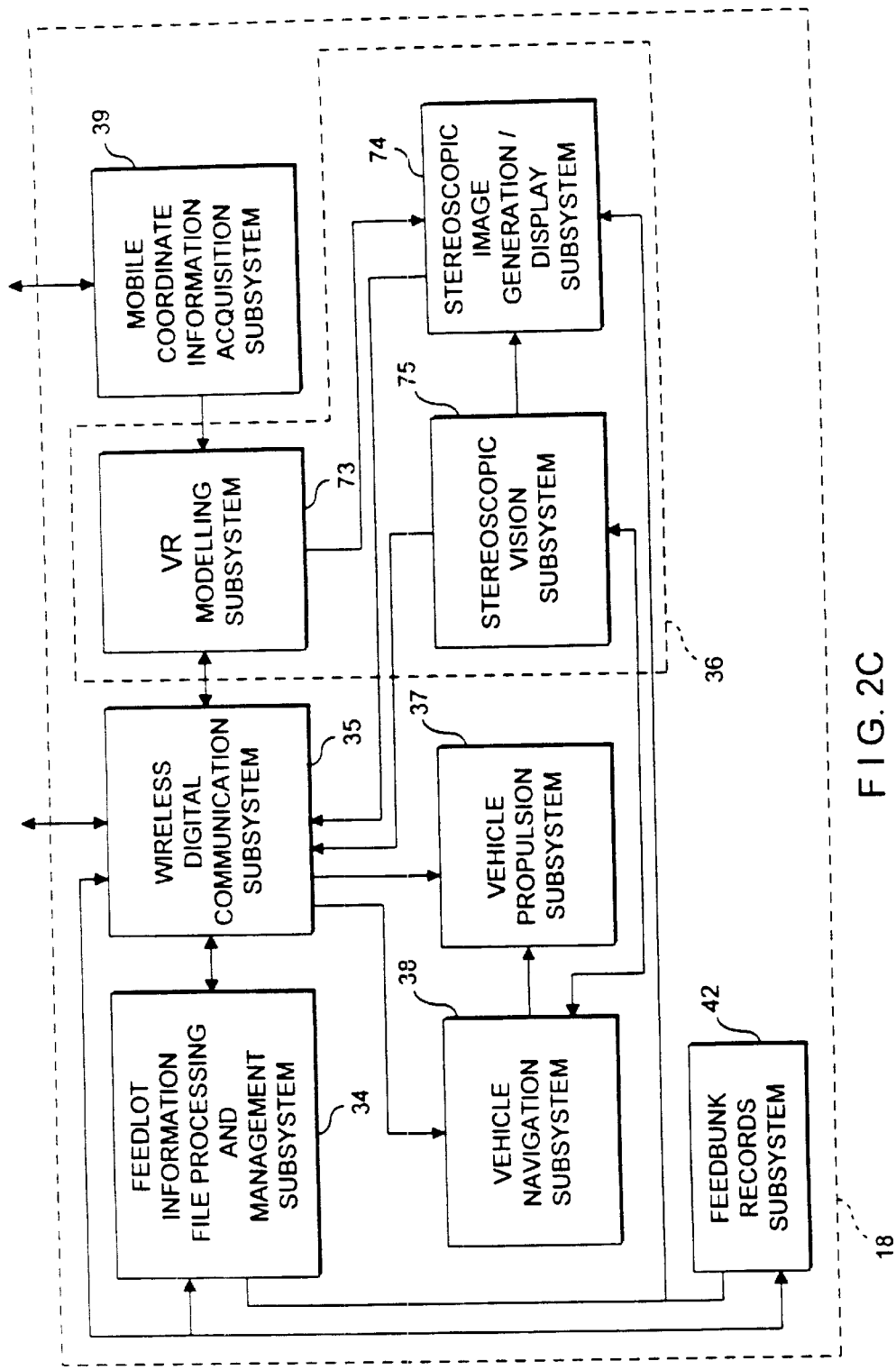
FIG. 2C is a system block diagram of the computer system aboard the feedbunk reading vehicle of the present invention.

As shown in FIG. 2C, the additional subsystems aboard the feedbunk reading vehicle hereof include: a vehicle propulsion subsystem 37; a vehicle navigation subsystem 38; a GPS-based coordinate information acquisition subsystem 39; and a feedbunk records subsystem 42. As shown, these additional subsystems are integrated with the other subsystems aboard the feedbunk reading vehicle to provide what can be viewed as single resultant system having a number of modes of system operation.

Figure 2D:
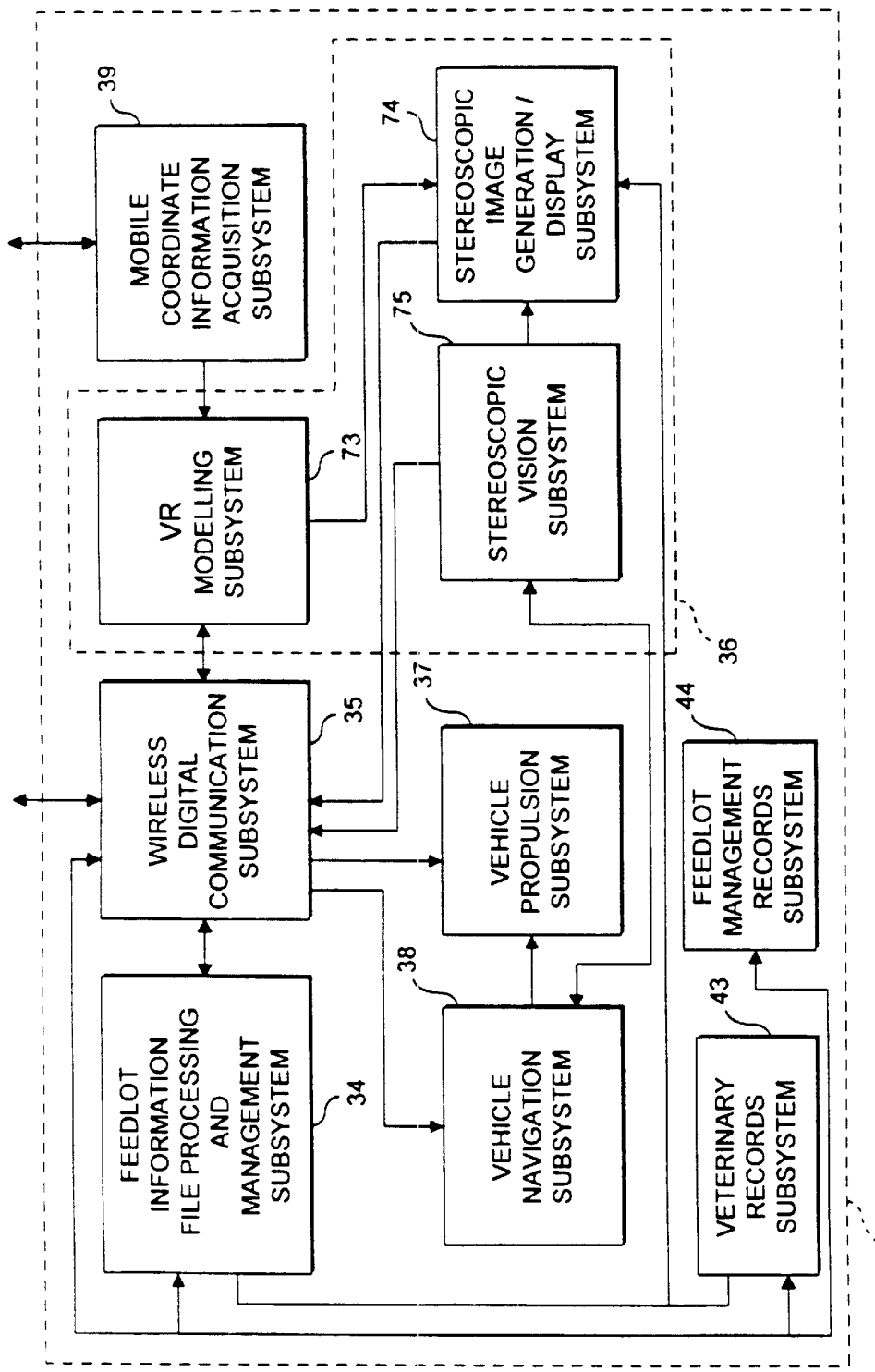
FIG. 2D is a system block diagram illustrating the subsystem components of the feedlot veterinary computer system in the computer network of the present invention.

As shown in FIG. 2D, the additional subsystems aboard the veterinary vehicle hereof include: a vehicle propulsion subsystem 37; a vehicle navigation subsystem 38; a GPS-based coordinate information acquisition subsystem 39; a veterinary (i.e. animal health) records subsystem 43; and a feedlot management records subsystem 44 (for when the vehicle is used by the feedlot manager). As shown, these additional subsystems are integrated with the other subsystems aboard the veterinary vehicle to provide what can be viewed as single resultant system having a number of modes of system operation.

Figure 2E:
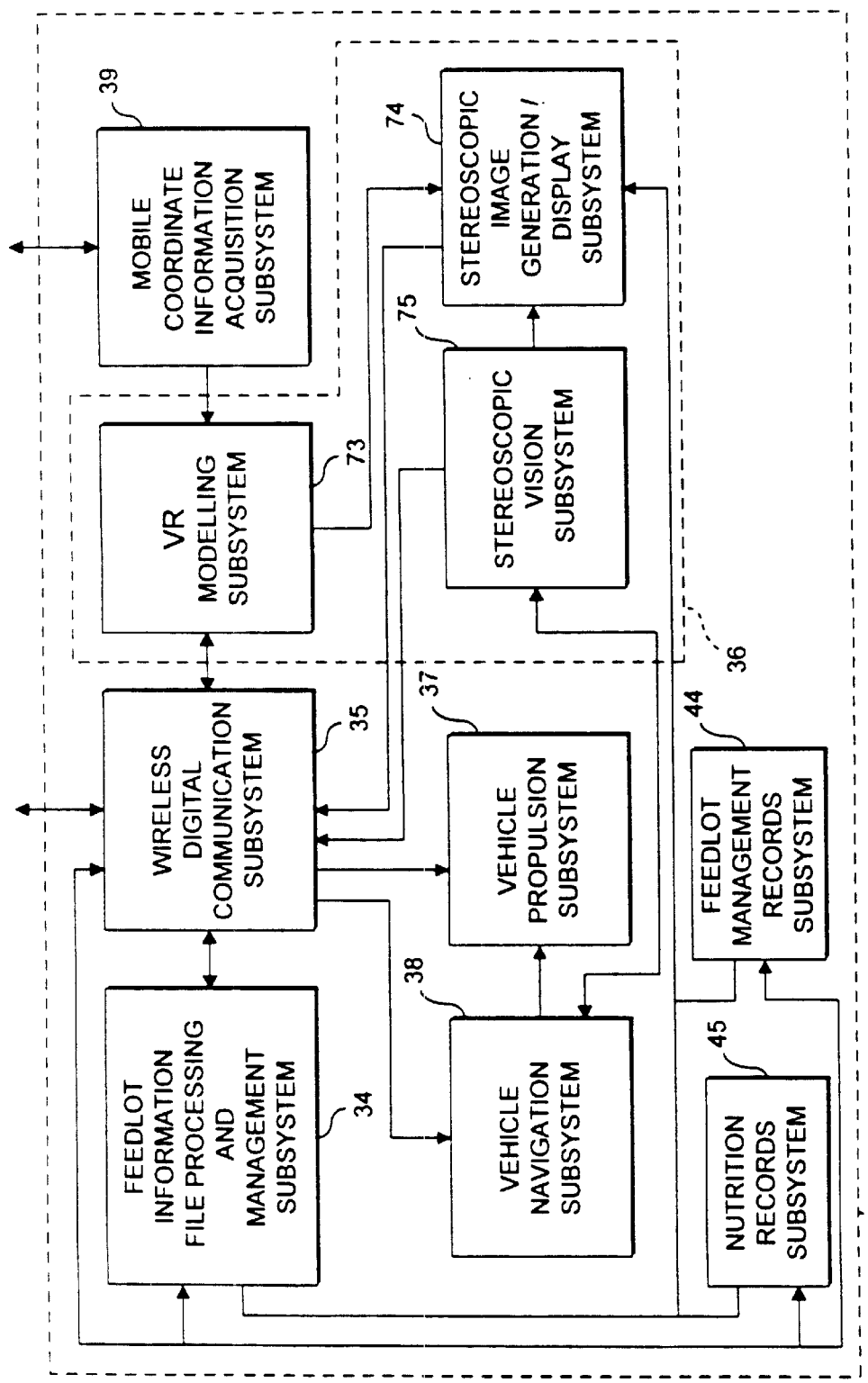
FIG. 2E is a system block diagram illustrating the subsystem components of the feedlot nutrition computer system in the feedlot computer network of the present invention.

As shown in FIG. 2E, the additional subsystems aboard the nutritionist vehicle hereof include: a vehicle propulsion subsystem 37; a vehicle navigation subsystem 38; a GPS coordinate information acquisition subsystem 39; a nutrition records subsystem 45 and a feedlot management records subsystem 44 (for when the vehicle is used by the feedlot manager). As shown, these additional subsystems are integrated with the other subsystems aboard the nutrition vehicle to provide what can be viewed as single resultant system having a number of modes of system operation.

Optionally, a separate vehicle, like feedlot vehicle 19A or 19B, can be provided for exclusive use by the feedlot manager, in which case it would be referred to as the "feedlot manager vehicle".

For purposes of illustration, the substructure of the additional subsystems identified above will be described hereinafter with reference to the schematic diagram of the feed delivery vehicle computer system shown in FIG. 2B2.

Figure 2F:
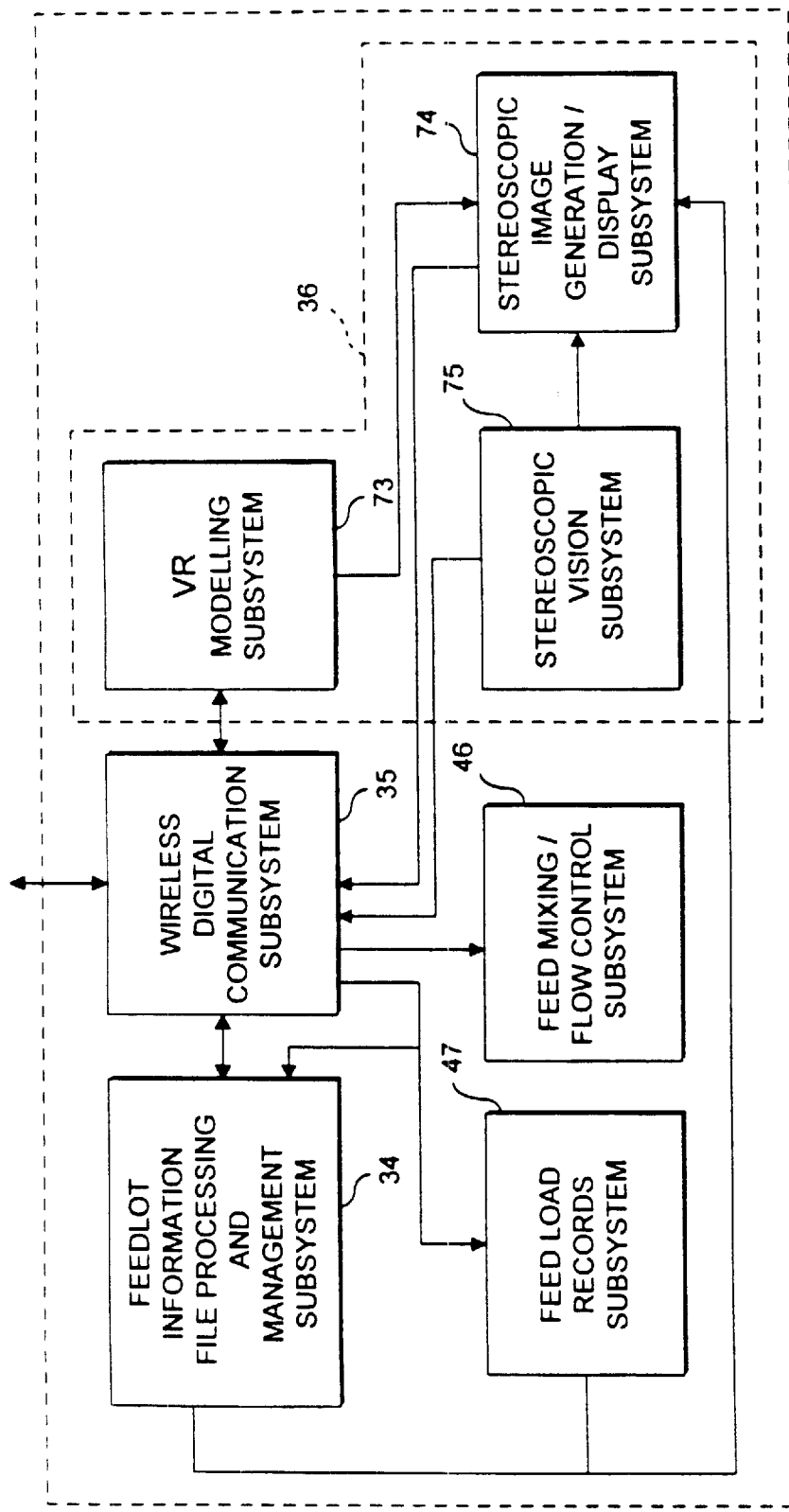
FIG. 2F is a system block diagram illustrating the subsystem components of the feedmill computer system in the feedlot computer network of the present invention.

As shown in FIG. 2F, the additional subsystems within the feedmill hereof include a feed mixing/flow control subsystem 46, and a feed load records subsystem 47. As shown these additional subsystems are integrated with the other subsystems of the feedmill computer system.

Figure 2G:
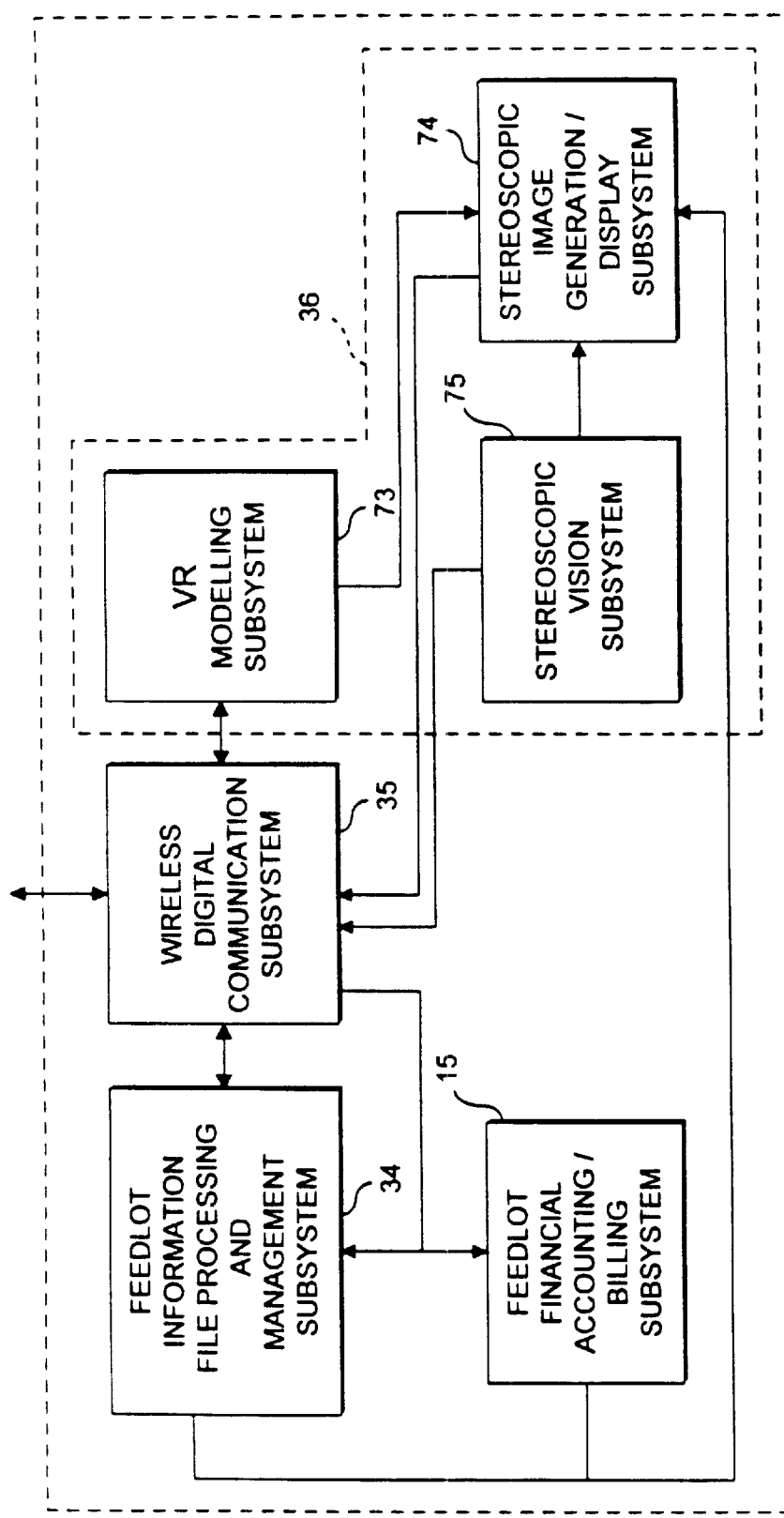
FIG. 2G is a schematic block diagram illustrating the subsystem components of the feedlot management computer system of the present invention.

As shown in FIG. 2G, the additional subsystems within the central office hereof include feedlot financial accounting/billing subsystem 15. As shown this additional subsystem is integrated with the other subsystems of the feedlot management computer system.

Figure 3:
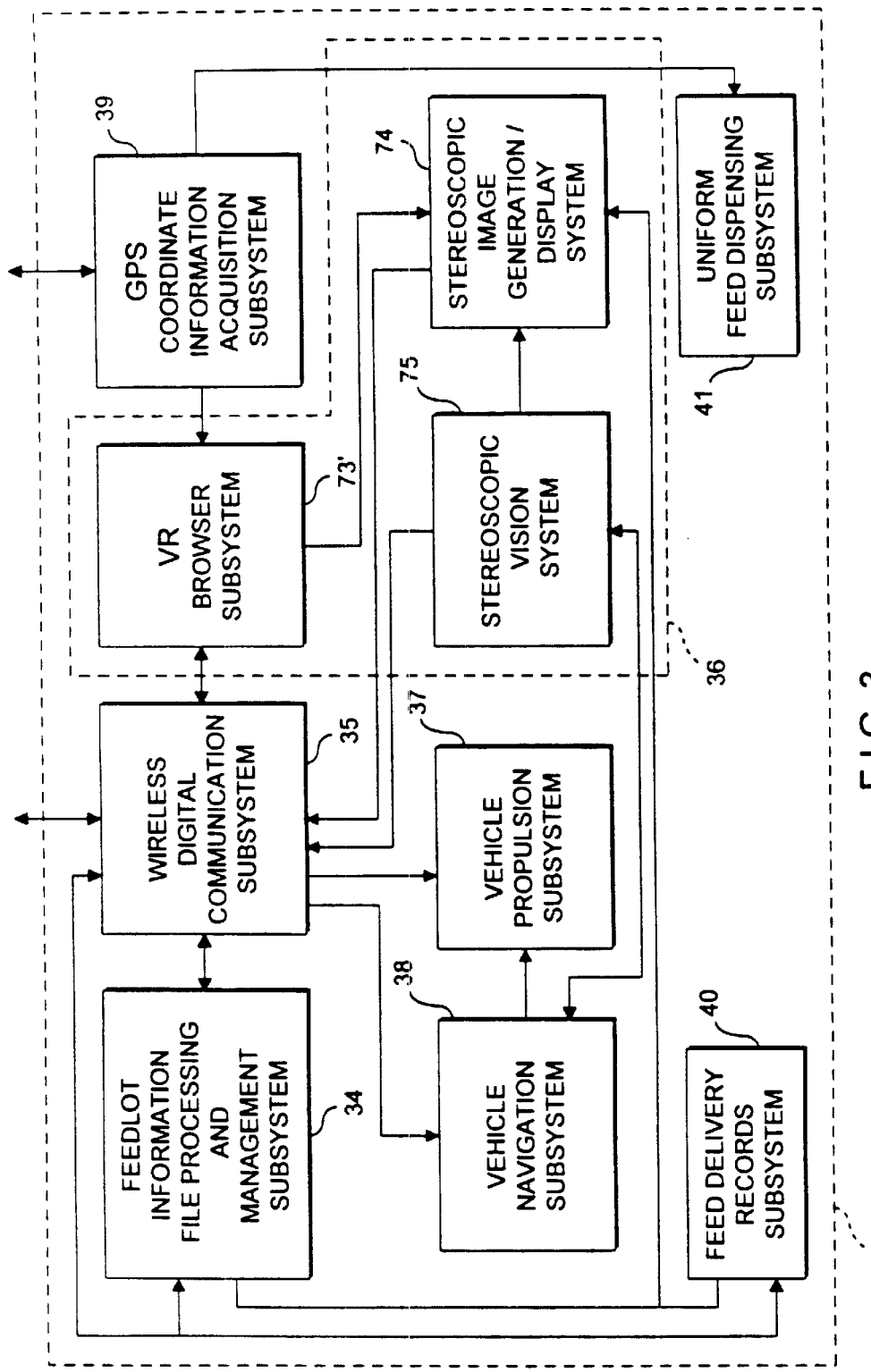

The primary function of the information file processing and management subsystem 34 is to provide general information file processing and management capabilities to the operator of each feedlot computer system in the feedlot management network hereof. As shown in FIG. 2B3, this subsystem is realized by providing each feedlot computer system with the following subcomponents: program storage memory 50 (e.g. ROM) interfaced with system buses 51 for storing of computer programs according to the present invention; information (file) storage database memory 52 (e.g. RAM) for storing various data files; a central processing unit (e.g. microprocessor) 53 for processing data elements contained in these information files (e.g. formatted in Hypertext Mark-up Language (HTML) for representation on a hypermedia System realized on the World Wide Web (WWW) of the Internet; a data entry device 54 (e.g. keyboard or keypad) and associated interface circuitry 54A; and an ultra-compact hard-copy color printer 55 and associated interface circuitry 55A for printing hardcopy images of selected display frames, including reports, tables, graphs, and color images of the VR-modelled feedlot.

The primary function of the wireless digital data communication subsystem 35 associated with each feedlot computer system is to provide a World Wide Web (WWW) site on the Internet for each feedlot computer system and LIAS 28i in the feedlot management system. The purpose of such subsystems is to facilitate the transmission and reception (i.e. uploading and downloading) of information files among the feedlot computer systems, VR workstations and LIASs throughout the feedlot computer network hereof. In the illustrative embodiment, such information files include: (1) HTML formatted feedlot information files associated with the various types of feedlot information files used to carry out the feed ration assignment and delivery processes described in Application Ser. No. 07/973,450; and (2) Virtual Reality Modelling Language (VRML) formatted files associated with the VR-based feeedlot model. Collectively, these digital communication subsystems 35, in cooperation with uplinks/downlinks, hubs, routers and communication channels, provide digital communications network 32 within the spatio-temporal extent of the feedlot. In the illustrative embodiment, digital communications network 32 provides wireless communication links to each and every feedlot computer system aboard the feedlot vehicles for high-speed mobile communications required to realize the system and method of the present invention.

Preferably, digital communications network 32 comprise one or more subnetworks of the Internet, and therefore is capable of supporting the TCP/IP protocol in a switched data packet communications environment well known in the digital communications network art. In the first illustrative embodiment of the present invention, digital communications network 32 includes an Internet server 32A (i.e. "feedlot Web server") which provides the feedlot with a site on the Internet (i.e. "feedlot web site"). At this Web site server, each feedlot computer system and LIAS is provided with an assigned set of information storage fields for storing (i.e. buffering) current coordinate information on vehicle or tagged-animal position, as well as information on the state of objects (e.g. vehicles, pens, tagged animals, etc.) in the feedlot at any instant in time. Periodically, (e.g. every second or fraction thereof) such information is remotely accessed from the feedlot Web site server 32A by the VR subsystem (e.g. using its VR Web browser) 36, which is provided at each feedlot computer system and VR workstation in the feedlot. Such information file transfer is achieved using conventional file transfer protocols (FTPs) well known in the Internet communications art. In turn, each VR subsystem uses the information accessed from feedlot Web server 32A to update the VR model locally maintained aboard the VR subsystem. This approach provides a way in which to update the VR-based feedlot model represented in each VR subsystem throughout the feedlot computer network.

Provided with such capabilities, digital communications network 32 can be viewed as comprising a plurality of information/communication nodes realized by the different computer systems shown in FIG. 2 and that these nodes (many of which being mobile) are linked together by wireless (electromagnetic-wave transmission) links in a manner that enables feedlot data file management and VR modelling and navigation in the feedlot management system of the present invention.

As shown in the exemplary schematic diagram of FIG. 2B1, the wireless digital communication subsystem 35 associated with each feedlot computer system is realized by: a model 67A interfaced to system bus 51 by data communication port 67A; an transreceiver 68 interfaced to modem 67; an antenna 69 connected to the transceiver permitting the feedlot computer system to transmit and receive information files over digital communication network 32; and networking software 70 for supporting a 3-D networking protocol allowing the coordination of multiple 3-D objects efficiently over the digital communication network (while supporting the standard Internet communication protocol TCP/IP). In the case of feedlot vehicles, the antenna 69 can be mounted outside the vehicle and electrically connected to RF transceiver 68 using conventional RF transmission cable.

Preferably, the 3-D networking software provided at each wireless digital communication system (i.e. node in the network 32) is capable of supporting a 3-D networking protocol such as the Standard Distributed Interactive Simulation (DIS)protocol, to provide support for the VR modelling and navigation functions of feedlot management system. Notably, the DIS protocol is capable of handing many different types of 3-D data file formats which may be transmitted over the feedlot computer network. Such 3-D data formats include VRML and Open Flight, which enable multiple 3-D objects (e.g. VR models of feedlot vehicles, animals, pens, building, feedlot equipment, feedlot resources such as medicines, microingredients, feed ration components, water sheds, feedlot airplanes and helicopters, etc.) to be efficiently coordinated over the digital communication network.

Consistent with coordinate referencing principles well known in the VR modelling art, global and local coordinate reference systems (i.e. coordinate reference frames) are symbolically embedded within the structure of the "real" animal feedlot being modelled within each VR subsystem (and VR workstation) in the feedlot management system hereof. As illustrated in FIGS. 1, 2A3, 2B4 and 2B5 the following coordinate reference frames are symbolically embedded with the specified portion of the feedlot: (1) a global coordinate reference system is symbolically embedded within the "real" animal feedlot, denoted as $R^R_{feedlot}$; (2) a local coordinate reference system is symbolically embedded within each $n^{th}$ "real" feedlot delivery vehicle, denoted as $R^R_{a\text{-}fdv}$; (3) a local coordinate reference system is symbolically embedded within the real feedbunk reading vehicle, denoted as $R^R_{frv}$; (4) a local coordinate reference is system symbolically embedded within the real veterinary vehicle, denoted as $R^R_{vv}$; (5) a local coordinate reference system is symbolically embedded within the real nutritionist vehicle, denoted as $R^R_{QV}$; and (6) a local coordinate reference system is symbolically embedded within each $i^{th}$ real animal pen in the feedlot, denoted as $R^R_{i\text{-}ap}$.

In practice, coordinate information obtained using a commercially available satellite-based GPS is expressed in terms of latitude and longitude measures, referenced with respect to an Earth-based coordinate reference system (i.e. $R^R_{Earth}$) historically centered in Greenwich, London, England. However, for purposes of simplicity, one may locate $R^R_{feedlot}$ as being spatially coincident with $R^R_{Earth}$, and reference all points in the feedlot with respect to $R^R_{Earth}$. Alternatively one may translate coordinates referenced in $R^R_{Earth}$ to $R^R_{feedlot}$ using homogeneous transformations, (i.e. mathematical mapping techniques) well known in the computer graphic and virtual reality modelling arts.

The function of the global coordinate reference system $R^R_{feedlot}$ is to provide a reference framework within which the position of all real objects in the feedlot can be specified. The function of each "local" coordinate reference system $R^R_{a\text{-}fdv}$, $R^R_{frv}$, $R^R_{vv}$ and $R^R_{av}$ is to provide a reference framework within which the position and orientation of the real feedlot delivery vehicle and its feed dispensing chute can be specified in relation to objects in the feedlot (e.g. feedbunks during feed dispensing operations, and feedmill filling chutes during feedtruck loading operations).

As will be described in greater detail hereinafter, the primary function of each VR subsystem is to maintain (i.e. update) a 3-D VR model for the feedlot and objects contained therein. Preferably, this VR feedlot model may be viewed as a collection of VR-based (sub)models, such of which is expressed using VRML well know in the VR modelling art. In the illustrative embodiment, VRML is used to design and create the following VR models on central VR workstation 71. Namely: a VR model of the feedlot and the objects contained therein, namely: (1) a VR model of "real" animal feedlot, denoted as $M_{feedlot}$; (2) a VR model of each $n^{th}$ "real" feed delivery vehicle, denoted as $M_{n\text{-}fdv}$; (3) a VR model of the real feedbunk reading vehicle, denoted as $M_{frv}$; (4) a VR model of the real veterinary vehicle, denoted as $M_{vv}$; (5) a VR model of the real nutritionist vehicle, denoted as $M_{nv}$; (6) a VR model of each $i^{th}$ animal pen in the feedlot, denoted as $M_{i\text{-}ap}$; and (7) a VR model of each $j^{th}$ animal "tagged" in the $i^{th}$ real animal pen in the feedlot, denoted as $M_{j\text{-}animal}$; etc. Ultimately are maintained and updated in each VR subsystem within the feedlot management system hereof.

In order to maintain correspondence between the "real" feedlot and the objects therein and the "VR models" thereof, it is also necessary to symbolically embed the following coordinate reference frames with the specific portions of the feedlot, namely: (1) a global coordinate reference system symbolically embedded within the "VR model" of the animal feedlot, denoted as $R^M_{feedlot}$; (2) a local coordinate reference system symbolically embedded within the "VR model" of each $n^{th}$ feed delivery vehicle, denoted as $R^M_{a\text{-}fdv}$; (3) a local coordinate reference system symbolically embedded within the VR model of the feedbunk reading vehicle, denoted as $R^M_{frv}$; (4) a local coordinate reference system symbolically embedded within the VR model of the veterinary vehicle, denoted as $R^M_{vv}$; (5) a local coordinate reference system symbolically embedded within the VR model of the nutritionist vehicle, denoted as $R^M_{QV}$; and (6) a local coordinate reference system symbolically embedded within the VR model of each $i^{th}$ animal pen in the feedlot, denoted as $R^M_{i\text{-}ap}$. While it is understood that these VR models embody information of a non-graphical nature, the geometrical aspects of certain of such VR models are shown in FIGS. 2A3, 2A4 and 2B2 for illustrative purposes.

In accordance with VR-world building (i.e. modelling) principles and techniques, a number of relations are established and maintained by the VR subsystem within the feedlot management system, namely: (1) the coordinate reference frame $R^R_{feedlot}$ symbolically embedded within the real feedlot is deemed isomorphic with corresponding coordinate reference frame $R^M_{feedlot}$ symbolically embedded within the VR model thereof $M_{feedlot}$; (2) the coordinate reference frame $R^R_{a\text{-}fdv}$ symbolically embedded with each real $n^{th}$ feed delivery vehicle is deemed isomorphic with corresponding coordinate reference frame $R_{a\text{-}fdv}$ symbolically embedded within each VR model thereof $M_{a\text{-}fdv}$; (3) the coordinate reference frame $R^R_{a\text{-}fdv}$ symbolically embedded within each real $n^{th}$ feedbunk reading vehicle is deemed isomorphic with corresponding coordinate reference frame $R^M_{frv}$ symbolically embedded within each VR model thereof $M_{frv}$; (4) the coordinate reference frame $R^R_{vv}$ symbolically embedded within the real veterinary vehicle is deemed isomorphic with corresponding coordinate reference frame $R^M_{fvv}$ symbolically embedded within the VR model thereof $M_{vv}$; (5) the coordinate reference frame $R^R_{QV}$ symbolically embedded within the real nutritionist vehicle is deemed isomorphic with corresponding coordinate reference frame $R^M_{nv}$ symbolically embedded within the VR model thereof $M_{QV}$; and (6) the coordinate reference frame $R^R_{i-ap}$ symbolically embedded within the $i^{th}$ real animal pen is deemed isomorphic with corresponding coordinate reference frame $R^M_{i-ap}$ symbolically embedded within the VR model thereof $M_{i-ap}$.

Using mathematical mapping techniques, such as homogeneous transformations, position coordinates specified within global coordinate reference system $R^M_{feedlot}$ can be easily related to coordinates specified within any local coordinate reference system. e.g. $R^M_{n-fdv}$. Consequently, coordinate information pertaining to the position of a feed delivery vehicle in the feedlot referenced with respect to $R^R_{feedlot}$ (derived aboard a feed delivery vehicle) can be translated into coordinate information referenced to any other local reference frame, e.g. coordinate frame $R^M_{i-ap}$ during feed dispensing operations involving the $i^{th}$ animal pen and feedbunk. With such capabilities provided aboard each feed delivery vehicle, the operator thereof can display on his dash-mounted LCD (navigation) panel, an updated VR model of the feed delivery vehicle (including its feed dispensing chute) shown in spatial relation to objects (e.g. feedbunks) modelled in the feedlot during vehicle operation. Other advantages of this subsystem will become apparent hereinafter.

For additional information on VR systems and techniques, reference can be made to the textbook entitled "Virtual Reality Systems" (1995) by John Vince, ACM SIGRAPH Series, published by Addison-Wesley, incorporated herein by reference.

As shown in FIGS. 2B1, 2C, 2D, 2E, 2F and 2G, the VR subsystem 36 associated with each feedlot computer system within the feedlot computer network is realized as integration of the following subsystems: a VR modeling subsystem 73; the stereoscopic image display subsystem 74; and the stereoscopic vision subsystem 75. Also, each VR workstation 20, 21, 23 and 27 associated with each feedlot vehicle VR workstations 25 and 26 installed in the feedmill and base office also includes a VR subsystem 36 allowing a human operator to establish a VR interface therewith.

The structure of the above-identified subsystem components will be described in greater detail below. In general, the primary function of VR modelling subsystem 73 is to support real-time VR modelling thereof within the animal feedlot so that a human operator sitting aboard a feedlot vehicle, or before a VR navigational workstation (20, 21, 23, 25, 26 or 27), can view VR-based feedlot models during feedlot operations. As shown in FIG. 2B3, the VR modelling subsystem 73 of the first illustrative embodiment, is realized by providing each feedlot computer system (and VR workstation) with an assembly of subsystem components, namely: a 3-D geometrical VRML) database 77 for storing information representative of 3-D VR models of the feedlot, its pens, feedbunks and alleyways, as well as each feedlot vehicle and RF-tagged animal therein; and a 3-D geometrical VRML) database processor 78. The primary function of 3-D VRML database processor 78 is to process the 3-D geometrical (i.e. VR) models represented by VRML or like information files stored within 3-D database 77 in order to: (i) update the position (and orientation) of objects in the feedlot during feedlot operations as well as during normal movement throughout the feedlot and; (ii) generate and render stereoscopic image pairs from the 3-D geometric models along a viewing direction specified by a set of viewing parameters that they may be generated in any number of ways. Another function of the 3-D VRML database processor 78 is to receive updated information on updated VR models, typically transmitted from VR subsystems over the network 32 during feedlot operations. For more detailed information on VRML and its information file structure, reference should be made to "VRML-Browsing and Building Cyberspace" 1995, by Mark Pesce, published by New Riders Publishing, Indianapolis, Ind., incorporated herein by reference.

The primary function of the central VR workstation 71 is to design and construct the original 3-D VR world model of: (i) the feedlot (e.g. buildings, animal pens and feedbunks, water-towers and sheds etc); (ii) feed delivery and other vehicles within the feedlot; as well as (iii) all or some (i.e. tagged) animals within the feedlot whose position and condition (e.g., ear temperature) are to be tracked and represented as part of the central VR-based feedlot model of the present invention. Preferably, VR workstation 71, and all other workstations in the feedlot, are each realized using a Silicon Graphics Reality-Engine™ or Indigo™ 3-D computer graphics workstation, or other suitable PC-based 3-D computer graphics workstation located inside the feedmill, or elsewhere within or outside of the feedlot proper. Suitable virtual reality (VR) world modelling software for constructing such 3-D VR models of the feedlot (and objects therein) on such workstation is commercially available from a number of software vendors including, for example: Superscape VRT™ Authoring Software from Superscape Limited, of Palo Alto, Calif.; from Sense 8™ VR Modeling Software Sense 8 corp. of Sausilito, Calif.; and dVISE™ VR World Authoring Software from Division Incorporated of Redwood City, Calif. In the illustrative embodiment, each VR workstation is provided with a keyboard, mouse-like 3-D pointing device, and a Grand Prix!™ driving-wheel (input device) from Thrustmaster, Inc., which clamps to the remote-operator desktop and offers steering and quick acceleration, braking, and shifting control on the steering wheel in order to remotely navigate a feedlot vehicle hereof.

By using VRML information files for each remotely-navigated vehicle in the feedlot, it also possible to represent in the VR model, virtually any type of quantifiable or qualifiable vehicle attribute, such as for example: (1) the quantity of feed remaining aboard the feed delivery vehicle; (2) the subsequence of animal pens at which feed ration has been previously dispensed along the prioritized feeding route; (3) the state of the propulsion subsystem (e.g. idle, forward motion, reverse motion, dispensing feed in the feedbunk, etc); (4) emergency situation in progress; and the like, and (5) the temperature of an RF-tagged animal in a particular animal pen. Such attributes, continuously updated in VRML information files transmitted to the each feedlot computer system and VR workstations 20, 21, 23, 25, 26 and 27, provides each human operator aboard a feedlot vehicle in its manned-navigational mode, or behind a VR workstation in its unmanned-navigational mode, with full-scale, (i) real-time VR modelling and interaction capabilities; and (ii) current information on the state of each feedbunk and tagged animal in the feedlot. Once created, the 3-D VR models of the feedlot are transferred to each VR modelling subsystem 73 by way of wireless digital communication network 32 linking together the VR workstations and feedlot computer systems in the feedlot.

The function of the mobile coordinate information acquisition subsystem 36 aboard each feedlot vehicle is to support real-time acquisition of both locally and globally referenced coordinate information. The globally referenced coordinate information specifies the position and orientation of the feedlot vehicle within the animal feedlot, relative to global coordinate reference frame $R^R_{feedlot}$. The locally referenced coordinate information specifies the position and orientation of any substructure aboard the feedlot vehicle (e.g. feed dispensing chute, etc) during feedlot operations with respect to the local coordinate frame symbolically embedded in the vehicle (i.e. $R^R_{feedlot-vehicle}$). Such acquired coordinate information it ultimately used to derive coordinates specifying the position, orientation and configuration of the feedlot vehicle in relation to all other objects in the feedlot (e.g., feedbunks, pens, alleyways, etc.). Once acquired, this coordinate information is transmitted from the feedlot vehicle (through the digital communication network 32 hereof) to each VR subsystem 36 within the feedlot computer network, including the VR workstations 20, 21, 23, 25, 26, 27 and 71 in the feedlot.

In accordance with the present invention, each feedlot vehicle may include one or more subsystems for measuring the coordinate position (and/or orientation) of particular substructures aboard the vehicle (e.g., feed dispensing chutes, ground tiller, etc.), relative to "locally" established coordinate reference frame symbolically embedded therein. Coordinate information locally inquired through such peripheral measuring devices permitted VR submodels of such substructure to be continuously updated for transmission over the wireless digital communication vehicle throughout the feedlot.

An example of such an on-board coordinate acquisition subsystem is the chute positioning subsystem installed aboard each feed delivery vehicle of the present invention. In the illustrative embodiment, this subsystem is realized aboard the feedlot vehicle by providing the feed delivery computer system with the following additional subsystem components: a data input port 80 for receiving encoded digital signals from (i) chute angle sensor 81 associated with the pivot joint of the feed dispensing chute located at pivot point $P_{FDCf}(n)$ in FIG. 2B5 to provide a measure of chute angle (defined in FIG. 2B5, and (ii) an ultra-sonic (or like) height or distance sensor for sensing the height of the end of the feed dispensing chute relative to the ground surface (which is assumed to be substantially planar in the feedlot) to derive the z coordinate of pivot point $P_{FDCf}(n)$ in $R^R_{feedlot}$.

Globally referenced coordinate information acquired by each feedlot vehicle and transmitted to all other VR subsystems in the feedlot management system is used to automatically update the position and orientation of the vehicle within the VR model thereof. This allows any one in the feedlot, with access to a VR subsystem (via its image generator/display subsystem) to ascertain (through display-screen visualization) exactly where any feedlot vehicle is at any particular instant of time, regardless of the navigational mode that it is operating in. Such information can be useful in the event one vehicle operator requires help, information or other form of assistance.

In order to realize such "global" coordinate acquisition functionalities within the feedlot management system, the mobile coordinate acquisition subsystem 39 aboard each feedlot vehicle computer system further comprises an array of subsystems components, namely: at least one (but preferably two) dual-band high-resolution GPS signal receivers 82A and 82B interfaced with the systems bus by interface circuitry 83A and 83B, for receiving electromagnetic GPS signals from the GPS satellites 30 and the GPS base station 31 and producing digital coordinate signals indicative of the coordinate position of the GPS from which its was transmitted; and a GPS signal processor 84 operably connected to the GPS signal receivers for processing the digital coordinate signals produced therefrom in order to obtain coordinate position data of the GPS receiver relative to a global feedlot reference system $R^R_{feedlot}$. In the illustrative embodiment, the dual-band high-resolution GPS signal receivers 82A and 82B are mounted maximally apart from each other on the feedlot vehicle body (i.e. at the ends of the longitudinal axis of the vehicle body). In the illustrative embodiment, the GPS signal processor 84 is also programmed to process coordinate information on GPS receiver location in order to compute: (1) the speed of the feedlot vehicle relative to the feedbunks and other stationary objects in the feedlot; and (2) the coordinate values associated with the location of the GPS receivers referenced to local coordinate reference system $R^R_{a-pdv}$.

The GPS receivers 82A and 82B aboard each feedlot vehicle may be operated in one of two modes: Stand-Alone Mode; or Differential Mode. In either mode, each GPS receiver receives two carrier signals L1 and L2 transmitted from each GPS satellite. In the illustrative embodiment, the frequency of the L1 carrier is 1,575.42 MHZ and the frequency of the L2 carrier is 1,227.6 MHZ. The carrier signals L1 and L2 are modulated with two types of code and a navigation message. In the illustrative embodiment, the two codes used to modulate the carriers L1 and L2 are the P code (i.e. the precision code) and the C/A code (i.e. the course/acquisition code). In order to obtain the highest degree of positional precision within the subsystem, the P code (or more precise code) is used to modulate the carrier signals transmitted by the GPS satellites during GPS signal transmission and also by GPS receivers during GPS satellite signal reception. The function of each GPS receiver then is to receive these modulated carrier signals transmitted from the GPS satellites, and thereafter recover the codes and any navigation message transmitted thereby., to compute the latitude and longitude of each GPS receiver and thus ultimately the x, y, z coordinates thereof in the coordinate frame $R^R_{feedlot}$.

In the Stand-Alone Mode, each GPS receiver operates exactly as described above, that is, it receives signals from GPS satellites and uses those signals to calculate its position with respect to $R_{feedlot}$ in the following manner. The GPS satellites modulate the L1 and L2 carriers with the P code, C/A code and navigation information. The navigation information includes the orbital position of the satellite with respect to coordinate system $R_{feedlot}$, expressed in terms of three position coordinates designated by (Us, Vs, Ws). Thus, by demodulating the carriers received at the GPS receiver, the GPS receiver can obtain the coordinate position of the satellite referenced to $R^R_{Earth}$. The GPS receiver can also measure the time required for each acquired satellite signal to travel from the satellite to the GPS receiver. The GPS receiver accomplishes this timing function by generating a code identical to the satellite code (P code for military receivers and C/A code for commercial receivers). The GPS receiver then code locks this replica with the received code by shifting the start time of the replica until maximum correlation is obtained. Since the receiver known the nominal starting time, "Ts", for the received code (which is repeated at regular predetermined intervals) and it knows the time shift, "Tr", required to obtain code lock, it knows the time for the signal to travel from satellite to the receiver, which is just the difference between the nominal start time for the satellite signal and the start time for the receiver replica. Multiplying this transit time "Tr–Ts" by the speed of the light "c" gives the nominal distance (or pseduo range) "P" between the GPS satellite and the GPS receiver:

$$P=(Tr-Ts)c$$

This distance P can also be expressed as the vector distance between GPS satellite and GPS receiver using earth based coordinates (referenced to $R^R_{feedlot}$):

$$P=[(Us-Ur)^2+(Vs-Vr)^2+(Ws-Wr)^2]^{1/2}$$

The three known variables in the above mathematical expression are the position coordinates of the satellite designated by (Us,Vs,Us), whereas the three unknown variables thereof are three position coordinates of the GPS receiver designated by (Ur, Vr, Wr). If signals from three GPS satellites are acquired at each GPS receiver, then these unknowns can be determined using the following mathematical relations:

$$P1=[(Us1-Ur)^2+(Vs1-Vr)^2+(Ws1-Wr)^2]^{1/2}$$

$$P2=[(Us2-Ur)^2+(Vs2-Vr)^2+(Ws2-Wr)^2]^{1/2}$$

$$P3=[(Us3-Ur)^2+(Vs3-Vr)^2+(Ws3-Wr)^2]^{1/2}$$

wherein the position coordinates (Us1,Vs1,Us1), (Us2,Vs2,Us2) and (Us3,Vs3,Us3) in the above mathematical expression are encoded in the received GPS signals and specify the position of the transmitting GPS satellite with respect to $R^R_{feedlot}$.

As taught at pages 205–206 in GPS SATELLITE SURVEYING (1990) by A. Leick, published by John Wiley and Sons (ISBN 0-471-81990-5), incorporated herein by reference, it is possible to correct for GPS receiver clock errors provided that signals from four GPS satellites are acquired at each GPS receiver. In such a case, a term "r" can be added to provide the following equations:

$$P1=[(Us1-Ur)^2+(Vs1-Vr)^2+(Ws1-Wr)^2+dTr^*c]^{1/2}$$

$$P2=[(Us2-Ur)^2+(Vs2-Vr)^2+(Ws2-Wr)^2+dTr^*c]^{1/2}$$

$$P3=[(Us3-Ur)^2+(Vs3-Vr)^2+(Ws3-Wr)^2+dTr^*c]^{1/2}$$

$$P4=[(Us4-Ur)^2+(Vs4-Vr)^2+(Ws4-Wr)^2+dtr^*c]^{1/2}$$

wherein the position coordinates (Us1,Vs1,Us1), (Us2,Vs2,Us2), (Us3,Vs3,Us3) and (Us4,Vs4,Us4) in the above mathematical expressions are encoded in the received GPS signals and specify the position of the transmitting GPS satellite with respect to $R^R_{feedlot}$. This scheme provides a way of achieving improved position resolution.

There are a number of errors associated with the Stand Alone Mode of operation described above. These include errors in the satellite atomic clocks, geometric resolution errors, and errors associated with the propagation of the carrier signals through the atmosphere. All of these errors can be eliminated by operating the system in the Differential Mode. In Differential Mode, each GPS receiver, in addition to monitoring GPS satellite signals, will receive error information transmitted from GPS base station 31 located at some known position. As shown in FIG. 2A2, the GPS base station 31 includes a receiver 86 for monitoring GPS satellite signals transmitted from the GPS satellites. In addition, the GPS base station includes a computer system 87 which has preprogrammed into its memory the precise position at which it is located relative to the global feedlot reference system $R_{feedlot}$. The function of the GPS based station computer 87 is to compare its known position (stored in its memory) with its coordinate position computed using the GPS satellite signals. The difference (i.e. error) between (i) the known GPS base station location and (ii) the calculated GPS base station location is used by modem 88 to modulate a carrier signal produced from transmitter 89. This transmitted error signal is received by the GPS receivers mounted on each feedlot vehicle. Using the received error measure, each such GPS receiver adjusts (i.e. corrects) in real-time its calculated position, thereby overcoming the limitations of the GPS receivers operated in the Stand-Alone Mode.

In many instances, the veterinarian or bunkreader may desire to quickly determine information pertaining to a particular animal in the feedlot, (e.g., the location of a particular animal within a given pen, its temperature at a particular time of the day, etc.). As shown in FIG. 2A3, the feedlot management system hereof realized this function by installing a local information acquisition subsystem (LIAS) 28i in the feedlot, preferably, at each animal pen thereof. The function of each $i^{th}$ LIAS of the illustrative embodiment is to (i) locally acquire coordinate information regarding the position of each "RF-tagged" animal with respect to the $i^{th}$ local animal-pen reference system $R^R_{i-ap}$, as well as the body temperature of the RF-tagged animal, and (ii) broadcast such information to each VR subsystem associated with the digital data communication network by way of feedlot Web server 32A, described above. Notably, when the coordinate information regarding the position of the RF-tagged animal is received at each VR subsystem, such coordinate information is automatically translated to the coordinate reference frame of the VR subsystem receiving the local coordinate information so that the complete VR-based feedlot model (including the tagged animal) can be updated. Preferably, the temperature information on each tagged animal is used to "color" code its corresponding VR animal model maintained in the VR subsystems. As shown in FIG. 2A3, each LIAS of the illustrative embodiment comprises: a plurality of miniature local position sensing (LPS) transmitters 90 (in the form of tags), each attachable to the ear or about the neck or each $j^{th}$ animal 91 in the $i^{th}$ animal pen, and capable of transmitting an encoded electromagnetic signal (e.g. in the RF range) with a transmission range spatially encompassing the $i^{th}$ pen; a three LPS signal receivers 92A, 92B and 92C mounted apart from each other along the $i^{th}$ animal feedbunk, for receiving (at different points in space) the signal transmitted from the LPS transmitter on each tagged animal in the pen, and processing the same in LPS signal processor 93 in order to determine the coordinate position (in terms of x,y,z) of each such head of cattle with respect to $R^R_{i-ap}$; a temperature-sensing RF chip 200, implanted in the ear of each such animal, sensing the body-temperature of he tagged animal and transmitting a digitally-encoded RF carrier signal carrying the sensed body temperature; and RF temperature-signal receiver 201 mounted along the feedbunk for receiving and processing the digitally-encoded RF-carrier signals transmitted from temperature-sensing RF chips 200; and a wireless digital communication subsystem 94, like subsystem 35, for transmitting such animal position-coordinate and body-temperature information to each VR subsystem in the feedlot computer network by way of feedlot Web server 32A.

In the illustrative embodiment, each RF tag 90 periodically produces an encoded RF signal of a particular frequency $f_j$. The RF tag includes a battery power supply, an RF transmitter circuit for producing an RF signal, and programmable circuitry for digitally encoding the transmitted RF signal in a manner well known in the RF-tagging art. At each $i^{th}$ animal pen, a local coordinate reference system $R^R_{ipen}$ is symbolically embedded therein, as shown in FIG. 2A3. Each LPS receiver receives the RF signal transmitted from each $j^{th}$ tagged animal, and using coordinate geometry principles, computes distance between the transmitting RF tag and the LPS receiver. Using these three distance measures and the known coordinates of the three LPS receivers, the LPS signal processor 93 computes the (x,y,z) coordinates of the $j^{th}$ RF tag relative to the local coordinate frame $R^R_{ipen}$. Computed in real-time, this locally referenced animal coordinate information is transmitted by subsystem 94 to each VR subsystem within the feedlot management system by way of the wireless digital communication network 32. At each VR subsystem, the coordinate information is used to update the VR model of the feedlot in a manner described above. Through coordinate translation, any feedlot vehicle pulled up to an animal pen, can determine exactly where, relative to its local coordinate reference frame, any RF tagged animal is within the animal pen, greatly simplifying the location and treatment of the animal.

In the preferred embodiment, the vehicle operator (e.g. the feedlot veterinarian) can automatically ascertain the body temperature of particular animals in the pen by viewing the animal's corresponding VR model maintained aboard the VR subsystem. The temperature sensing RF chip 200 implanted within the ear of each tagged animal produces a RF carrier signal digitally modulated by the sensed body-temperature of the animal. Different frequencies or codes can be used with each RF chip 200 to establish cross-talk free channels for each tagged animal in a manner known in the prior art. The RF temperature signal receiver 201 at each animal pen (or otherwise in the feedlot) receives the RF signal from each RF chip 200 employed in the animal pen (or feedlot), demodulates the same to detect the transmitted body-temperature of the tagged animal, and then provides this information to digital communication subsystem 94 for transmission to a preassigned subsite (i.e. information field) maintained at the feedlot Web server 32A. Functioning as a Web or VR browser, each VR subsystem 36 in the feedlot accesses the updated temperature information from the feedlot Web server 32A and used the same to update the VR animal models maintained at each VR subsystem in the feedlot management system.

As shown in FIG. 2A3, the LIAS at each animal pen may also include one or more real-time stereoscopic vision subsystems 300 mounted in the feedlot to provide a field of view (i) along the length of each feedbunk (for remote bunk reading operations carried out at a VR workstation), as well as (ii) into the animal pen where the contained animals are allowed to roam (for remote pen and animal inspection carried out at a VR workstation). Such stereoscopic camera subsystems are commercially available from VRex, Inc. of Hawthorne, N.Y. The digital video output from such stereoscopic cameras can be provided to the digital communication subsystem 94 at the animal pen where it is properly packeted and then transmitted to the feedlot Web server 32A, for access by any VR subsystem (i.e. VR browser) 36 as the Internet-based digital communication system of the feedlot computer network.

As shown in FIG. 2A3, an information entry/display terminal 210 is also provided at each animal pen in order to enter information to and display information from the feedlot computer network. This terminal 210 is realized as a separate computer subsystem connected to network 32 by way of its digital communication subsystem 35.

In general, the primary function of the stereoscopic image display subsystem 74 associated with each VR subsystem is to visually display (to the eyes of an operator) high-resolution stereoscopic (or monoscopic) color images of feedlot information files as well as any aspect of the continuously updated VR-based feedlot model. In the illustrative embodiment, each feedlot vehicle operator is provided with two modes of "VR feedlot model navigation", which is to be distinguished from the two modes of "real feedlot navigation" provided for navigating the real feedlot vehicle through the real feedlot, i.e. manned-navigational mode and unmanned-navigational mode. In the first mode of VR feedlot model navigation, the global coordinates of the "real" feedlot vehicle (at each instant of time) determines the portion of the VR-based feedlot model in which the VR-model of the feedlot vehicle is automatically displayed on the LCD panel within the vehicle during the manned-navigation mode of operation, or on the LCD panel of the VR workstation during the unmanned navigation mode of operation. In the second mode of VR feedlot model navigation, the global coordinates selected by the input device of a feedlot operator (at each instant of time) determines the portion of the VR-based feedlot model which is automatically displayed on the LCD panel within the vehicle, or on the LCD panel of the VR workstation, whichever the case may be.

Typically, each feedlot vehicle operator will have a need to view different aspects of the VR-based feedlot model within his VR subsystem. For example, the feed delivery vehicle operator may desire to view, in real-time, a plain view or rear-end view of the VR-based model of his vehicle as he proceeds to navigate it alongside a feedbunk during a uniform feed dispensing operation in accordance with the present invention.

By initiating a practice of color-coding particular sections of the VR-based model for each feedbunk in the feedlot, it is possible to construct a VR feedbunk model which visually indicates (by specific colors or textures) those sections of the corresponding feedbunk along which there appears to be abnormal or irregular feeding patterns. By comparing the current VR feedbunk model with the corresponding "real" feedbunk (in the purview of the bunkreader), it is possible for the bunkreader to deduce feeding patterns and trends which might suggest or require corrective measures by the veterinarian and/or nutritionist. An advantage of the VR-based feedbunk model is that the bunkreader, veterinarian and nutritionist can easily and quickly be informed of particular conditions in the feedlot by 3-D visualization of information gathered on the state and condition of the feedlot.

Using the stereoscopic image display subsystem 74 of the present invention, color images of any aspect of the VR feedlot model can be projected from any desired viewing direction selected by the vehicle operator during manned as well as unmanned modes of vehicle navigation. In general, the viewing direction is specified by a set of viewing parameters which, in the illustrative embodiment, can be produced using any one of a number of commercially available 3-D pointing devices which can be readily adopted for mounting on the dashboard adjacent the LCD panel and easily (and safely) manipulated by the vehicle operator during vehicle operation. Using such a pointing device, the vehicle operator can easily select the desired aspect of the VR feedlot model to be viewed during navigation, and feedlot operation (e.g. feed dispensing operations).

In the illustrative embodiment, the stereoscopic image display subsystem 74 is realized by providing each feedlot computer system hereof with subsystem components comprising: a stereoscopic LCD panel 95; an associated display processor 96; and VRAM 97 for buffering stereoscopic pairs to be displayed on LCD panel 95. The function of the LCD panel is to display (i) feedlot information files or portions thereof, and (ii) 2-D high-resolution color images of the VR-based model of the 3-D feedlot so as to support stereoscopic 3-D viewing thereof from any desired viewing direction in 3-D space.

A variety of stereoscopic 3-D display techniques and equipment for achieving this function are known in the virtual reality systems art. The preferred stereoscopic display technique would be based on polarization encoding/decoding of spatially-multiplexed images (SMIs) produced by combining the left and right perspective images of a real or synthetic 3-D object into a single composite image (the SMI). During the image display process, left image pixels in each displayed SMI are encoded with a first polarization state P1, whereas the right image pixels in each displayed SMI are encoded with a second polarization state P2, orthogonal to P1. Such micropolarized SMIs can be produced from an LCD panel with a display surface bearing a micropolarization panel well known in the stereoscopic 3-D display art. Such LCD panels and required SMI generation apparatus are commercially available from VRex, Inc. of Hawthorne, N.Y. When navigating his vehicle alongside a feedbunk (during a uniform feed dispensing operation) as shown in FIG. 2A1, the driver views polarized-SMIs displayed on the LCD panel while wearing a pair of electrically-passive polarizing eyeglasses 98 in a conventional manner. The function of such polarizing eyeglasses is to allow the driver's left eye to only see the left perspective image component of the displayed SMI, while permitting the driver's right eye to only see the right perspective image component of the displayed SMI. By this viewing process, the driver is capable perceiving feedlot imagery displayed on the micropolarizing LCD panel with full 3-D depth sensation. At the same time, solar glare transmitted to the interior of the vehicle cab is inherently reduced by the passive polarizer eye glasses 97 worn by the driver.

As will become apparent hereinafter, the image display subsystem 74 is capable of generating and displaying stereoscopic images of the 3-D VR models of the feed delivery vehicle and feedbunk, near which the "real" feed delivery vehicle is physically located. With such a driver-display interface, the driver is afforded true 3-D depth perception of the 3-D VR models of each and every object in the VR feedlot models (e.g. feedbunks, feed delivery chute, etc.) during real-time feed dispensing operations.

The primary function of the vehicle propulsion subsystem 37 aboard each feedlot vehicle within the feedlot is to propel the feedlot vehicle along a navigational course determined by the navigational subsystem when operated in its selected navigational mode. In the illustrative embodiment, this subsystem is realized by an internal combustion engine, coupled to an electronically controlled power transmission. Examples of suitable electronic power transmissions are described in U.S. Pat. No. 5,450,054 and the references cited therein, which are all incorporated herein by reference.

The function of the navigation subsystem 38 is to allow the associated feedlot vehicle to be navigated within the feedlot during feedlot operations. In general, the navigation subsystem is capable of providing such support in both the manned-navigational modes and unmanned-navigational modes of vehicle operation. As such, the navigation subsystem includes a manually-operated steering system and a foot or hand-operated braking system which enables the on-board operator to manually steer the vehicle along a desired navigational course throughout the feedlot. The navigational subsystem also includes an electronically-controlled steering system and an electronically-controlled braking system which enables a remotely situated operator, sitting before the associated VR workstation (e.g. 20, 21, 23, 27), to remotely steer the corresponding vehicle along a desired navigational course throughout the feedlot which has been preprogrammed into the VR workstation or improvised in real-time by the remote operator.

The function of the stereoscopic vision subsystem 75 mounted aboard each feedlot vehicle, or located at each feedlot building, is to capture in real-time both left and right perspective images of 3-D objects (or scenery) in the field of view (FOV) thereof. Notably, each left and right perspective image detected by this subsystem is commonly referred to as a stereoscopic image pair. Preferably, the field of view of this subsystem is directed along the longitudinal axis of the vehicle in order to permit a remote operator thereof to view 3-D scenery along the navigational course which the vehicle is propelled to travel during feedlot operations.

As shown in FIGS. 2B2, 2C1, 2D1 and 2E1, stereoscopic vision subsystem 75 aboard each feedlot vehicle can be realized using an ultra-compact stereoscopic (3-D) camera system 99 commercially available from VRex, Inc. of Hawthorne, N.Y. As shown in these figure drawings, this camera system is mounted upon a rotatable support platform 100 which, in turn, is mounted upon the hood of the feed delivery vehicle. The camera support platform is remotely controllable from the associated VR workstation to permit the remote operator of the vehicle to control the viewing parameters of the stereoscopic camera (e.g. the direction of the camera optical axes, the point of convergence thereof, the focal distance of the camera, etc.) during the un-manned modes of operation. Using a head and eye tracking subsystem 101 at the VR workstation, the remote operator can easily select such stereoscopic camera (i.e. viewing) parameters during the unmanned-navigational mode, by simply moving his head and eyes relative to the LCD display screen of the VR workstation. Such natural head and eye movements of the remote operator will change the viewpoint of the images displayed on the LCD panel 95 of the workstation, and thus allow the remote operator to interact with the VR model of the remotely controlled feedlot vehicle under his or her control.

It is understood that each feedlot vehicle according to the present invention may support one or more auxiliary subsystems for use in carrying out a particular feedlot function. In particular, each the feed delivery vehicle in the feedlot is also provided with uniform feed dispensing subsystem 41 which includes a feed dispensing chute 105 and associated controllers. The function of this auxiliary subsystem is to uniformly dispense assigned feed ration along the length of a particular feedbunk in an automatic manner as the vehicle is navigated alongside the feedbunk in either the manned-navigational mode or unmanned-navigational mode of the vehicle.

In the illustrative embodiment, the uniform feed dispensing subsystem is realized by providing the computer system aboard the feed delivery vehicle with the following additional subcomponents: a data communication port 106 for receiving digital information from an on-board truck scale 107 regarding the weight of the feed contained within the feed storage compartment 108 on the vehicle; hydraulic valve 109, electronically controlled by control signals $S_{HV}$, for controlling the flow rate of feed ration from the storage bin 108 by way of a auger 110 rotatably mounted along the feed dispensing chute 105; a programmed feed dispensing controller (i.e. microprocessor) 111 for producing control signals $S_{HV}$ for controlling the operation of hydraulic valve 109 during feedbunk filling operations; and a data communication port 112 for transmitting such control signals $S_{HV}$ to the hydraulic valve. The function of the scale 107 is to measure the actual amount of feed loaded onto an assigned feed delivery vehicle at the feedmill and subsequently dispensed into the feedbunks associated with an assigned pen sequence. In response to weight measurement, the scale produces an electrical signal $S_1$ indicative of the total weight of the feed contained within feed load storage compartment 108. Signal $S_1$ is digitized and provided as input to the computer system aboard the feed delivery vehicle. By measuring the weight of the feed within storage compartment 108 and recording these measurements in memory of the on-board computer system, the computer system computes the actual amount of feed ration either (i) supplied to the feed load storage compartment during the feed loading process at the feedmill, or (ii) dispensed therefrom into the feedbunk of any pen in the feedlot. Such computations can be implemented in a straightforward manner using programming techniques well known in the art.

The primary goal of the uniform feed dispensing subsystem 41 is to ensure that feed is delivered to each feedbunk in a substantially uniform manner (i.e. equal amount of feed dispensed per linear foot travelled by the feed delivery vehicle). In the preferred embodiment, control signals $S_{HV}$ are generated in real-time by the computer system aboard feed delivery vehicle using (i) digitized signal $S_1$ indicative of the total weight of the feed contained within feed load storage compartment 108, and (ii) digital signal $S_2$ indicative of the speed of the vehicle, relative to the Earth. Signal $S_2$ can be generated in one of several possible ways. One way is to use the GPS processor 84 to produce digital signal $S_2$ on the basis of the position coordinates of the feed delivery vehicle over time. Alternatively, a ground speed radar instrument 114, mounted aboard the feed delivery vehicle, can be used to produce an electrical signal $S_s$ which is indicative of the true ground speed of the vehicle. Notwithstanding method used to derive vehicle speed signal $S_2$, signals $S_1$ and $S_2$ are sampled by the feed dispensing controller 111 at a sufficient rate and are utilized by a Uniform Feed Dispensing Control Routine (executed within the feed delivery vehicle computer system) to produce control signal $S_{HV}$ which is provided to the hydraulic valve of uniform feed delivery control subsystem 41. In this way, the computer system aboard each feed delivery vehicle automatically controls the incremental dispensation of feed in a manner such that, for each linear foot traversed by the feed delivery vehicle, a substantially constant amount of feed ration is dispensed along the total length of the feedbunk, independent of the speed of the vehicle.

As shown in FIG. 1, feed mixing/flow control subsystem 46 at the feedmill comprises: feed ration storage bins 10A, 10B and 10C for storing feed ration ingredients for dispensing and mixing together; an overhead scale 115 for measuring the weight of feed rations dispensing therefrom; feed ingredient metering and mixing equipment 11: a storage bin 116, and a microingredient dispensing system 117 for producing a microingredient slurry for application to a prepared batch of feed ration. The function of the storage bin 116 is to contain feed ration which has been prepared for loading onto the feed delivery vehicles and dispensing into particular sequences of animal feedbunks in the feedlot. The function of scale 115 is to provide an electrical signal indicative of the total weight of prepared feed ration contained within the storage bin. The electrical signal produced from the scale is digitized and provided as input to the feedmill computer system. By measuring the weight of the feed within the feed ration storage bin and recording these measurements in the feedmill computer system, the actual amount of feed ration prepared and loaded onto a particular feed delivery vehicle can be computed in a straight forward manner. The microingredient dispensing system can be constructed in the manner disclosed in U.S. Pat. No. 5,487,603, which is incorporated herein by reference in its entirety. In a manner known in the art, metering and mixing equipment 11 at the feedmill is controlled by electrical (and hydraulic) control signals generated by a Feedmill Control Program running within feedmill computer system 18. As will be described in greater detail hereinafter, the feedmill computer system of the present invention is provided with computer programs (i.e. software) for: (i) assigning feed load and pen subsequence assignments, as will be described in detail hereinafter; and (ii) controlling metering and mixing equipment 11 at the feedmill. Suitable feedmill control software is commercially available from Lextron, Inc. under the tradename FLOWCON. Feedload records subsystem 47 equipped with computer software, is used to maintain records in the assigned feed ration loaded into each feed delivery vehicle and the subsequence of pens to which such feed are to be delivered.

At the central office, the feedlot manager can supervise all aspects of operation within the feedlot management system including accounting and billing operations. Such operations are carried out using financial accounting/billing computer subsystem 15 interfaced with feedlot management computer system 14, as shown in FIG. 2G. Financial accounting/billing subsystem 15 is equipped with conventional financial accounting software suitable for feedlot accounting and billing operations. Suitable financial software is commercially available from Turnkey Systems, Inc. under the tradename TURNKEY. In an alternative embodiment, the computer software for financial accounting/billing operations can be run on the a single feedlot management computer system.

In the veterinary vehicle, the veterinarian is able to access, create, modify or otherwise maintain animal health (veterinary) records on the health of particular animals in the feedlot. During the manned-navigational mode of the veterinary vehicle, the veterinarian navigates his/her vehicle while sitting within the cab thereof in a conventional manner. In this mode, the veterinarian can use the veterinary records subsystem thereaboard to create. Store and access feedlot data files on particular animals for review and data entry. Also, the veterinarian can use the VR subsystem to determine the body-temperature and location of "tagged" animals in particular pens at any given moment by simply reviewing the updated VR-based feedlot model on the dash-mounted LCD panel aboard the veterinary vehicle, or the LCD panel of his VR workstation. When the veterinary vehicle pulls up to a particular animal pen, the VR-based model of the corresponding animal pen (and tagged animal therein) is automatically displayed on the dash-mounted LCD panel in the vehicle. From the color-code of each tagged animal represented in the VR feedlot model, the veterinarian can readily ascertain the body-temperature and precise location of particular cattle in the feedlot, for visual inspection and treatment if necessary.

In the illustrative embodiment, such operations are carried out with the assistance of the veterinary records subsystems 43. Preferably, subsystem 43 is realized by a computer program having a number of different routines for carrying out various data processing and transfer operations relating to veterinary health care of the cattle in the feedlot.

In the illustrative embodiment, the nutrition records subsystem 45 aboard the nutrition vehicle runs a computer program having a number of different routines which carry out various data processing and transfer operations relating to the diet and nutrition of the cattle in the feedlot. The nutritionist can use the on-board VR subsystem to ascertain information useful to the diagnosis and treatment of nutritionally-deficient animals in the feedlot.

In FIG. 2B2, the n$^{th}$ feed delivery vehicle of the present invention is shown operated in its manned-navigational mode, in which the operator thereof navigates the vehicle while sitting within the cab of the vehicle. While operating his vehicle, he is able to view dashboard-mounted color LCD panel 95, upon which a 3-D VR model of his vehicle (within the feedlot) is automatically displayed and viewed stereographically by the driver wearing polarizing glasses 98. The function of the VR subsystem of this vehicle embodiment is to provide visual assistance to a human operator aboard the vehicle while he (manually, or semi-manually) navigates the feed delivery vehicle through the feedlot during feed dispensing operations, feed loading operations and the like. Using the VR subsystem of this embodiment, the human operator is able to view on the LCD panel, a dynamically updated VR model of the feed delivery vehicle (his is navigating) in spatial relation to (i) the feedbunk being uniformly filled during uniform feed dispensing operations, (ii) in spatial relation to the feedmill filling chute during feed loading operations, and (iii) in spatial relation to any feedlot structure during an operation involving the feedlot delivery vehicle. In FIG. 2B2', the n$^{th}$ feed delivery vehicle is shown operated in its unmanned-navigational mode, in which the operator thereof navigates the vehicle while sitting before the remotely-located VR-navigation workstation 27 (associated with the vehicle).

The VR workstation 27 associated with each feed delivery vehicle allows a human operator to remotely navigate a feed delivery vehicle through the feedlot during feed loading the feed dispensing operations, while sitting before the VR workstation, rather than within the feed delivery vehicle. The advantage provided by this embodiment of the VR subsystem is that a remote human operator, sitting at the VR workstation in the feedmill, can remotely navigate the feed delivery vehicle through the feedlot (in either an automatic or semi-automatic manner) during feed dispensing operations, feed loading operations as well any other operation in the feedlot.

During remote management of feed (loading) and dispensing operations, the human operator can view from the LCD panel 95 of VR workstation 27, stereoscopic images of a dynamically updated 3-D VR model of the feed delivery vehicle shown in spatial relation to the feedbunk being uniformly filled during feed dispensing operations. Optionally, using split-screen image display techniques, stereoscopic 3-D images of feedlot scenery captured within the field of view of the stereoscopic vision subsystems 75 (aboard the vehicle) can be displayed on the LCD panel of the VR workstation in the feedmill. In this mode, captured images of real objects about the feed delivery vehicle are displayed on the LCD panel of the workstation and can be used by the remote operator to avoid vehicular collision therewith as the feed delivery is propelled by the propulsion subsystem 37 along the pre-plotted navigational course programmed with the navigational subsystem 38. Alternatively, the stereoscopic vision subsystem 75 and the navigational subsystem 38 can cooperate to automatically avoid collision with objects along the pre-plotted navigational course using collision avoidance techniques well known in the robotic control arts. In either mode of operation, the advantage provided by this novel arrangement is that the remote operator can use the VR subsystem to: (i) remotely position the end of the feed dispensing chute with the end point (i.e. beginning) of the feedbunk to be filled during the beginning of each feedbunk filling operation; as well as (ii) remotely maintain the end of the feed dispensing chute over the centerline of feedbunk during dispensing operations.

In FIG. 2C1, the feedbunk reading vehicle of the present invention is shown operated in its manned-navigational mode, in which the bunkreader navigates the vehicle while sitting within the cab of the vehicle. In FIG. 2C2, the feed delivery vehicle is shown operated in its unmanned-navigational mode, in which the bunkreader thereof navigates the vehicle (and remotely reads the feedbunks) while sitting before the remotely-located VR-navigation workstation 23 (associated with the vehicle).

In FIG. 2D1, the veterinary vehicle of the present invention is shown operated in its manned-navigational mode, in which the veterinarian navigates the vehicle while sitting within the cab of the vehicle. In FIG. 2D2, the veterinary vehicle is shown operated in its unmanned-navigational mode, in which the veterinarian thereof navigates the vehicle (and remotely examines animals in pens for signs of sickness) while sitting before the remotely-located VR-navigation workstation 20 (associated with the vehicle).

In FIG. 2E1, the nutrition vehicle of the present invention is shown operated in its manned-navigational mode, in which the nutritionist navigates the vehicle while sitting within the cab of the vehicle.

In FIG. 2E2, the nutrition vehicle is shown operated in its unmanned-navigational mode, in which the nutritionist thereof navigates the vehicle (and remotely examines animals in pens for malnutrition) while sitting before the remotely-located VR-navigation workstation 20 (associated with the vehicle).

While not shown, the feedlot management vehicle of the present invention can be operated in its manned-navigational mode, in which the feedlot manager navigates the vehicle while sitting within the cab of the vehicle. In FIG. 2G1 the feedlot manager vehicle is shown operated in its unmanned-navigational mode, in which the feedlot manager thereof navigates the vehicle (and remotely inspects the feedlot) while sitting before the remotely-located workstation 25 (associated with the vehicle). In FIG. 2F1, the feedmill operator is shown before VR workstation 26 while carrying out his function in the feedmill.

In the manned-navigational mode shown in FIG. 2B1, the vehicle operator (i.e. the feedbunk reader) sits within the cab of the vehicle. During feedbunk reading operations, the feedbunk reader can use the VR subsystem aboard his vehicle in a number of ways.

For example, the bunkreader can readily determine the position, orientation and state of each feed delivery vehicle in the feedlot by viewing the VR model of the feedlot on the dash-board mounted LCD panel within the cab of the feedbunk reading vehicle, shown in FIG. 2B2. The continuously updated 3-D VR model of such feed delivery vehicles can be viewed from any viewing direction selected by the feedbunk reader. The position and state information can be displayed in various formats depending on the needs and desires of the feedbunk reader.

From time to time, the feedlot nutritionist may decide to change or modify either the types of feed ration (and/or the ingredients contained therein) which are fed to the cattle in the feedlot. When such a decision has been made, a Feed Ration Change File is created within the feedlot nutrition computer system by the nutritionist, and is then transmitted to the feedlot management computer system over the wireless telecommunication link established by digital communications network 32. When such a transmission arrives at the feedlot management computer system, a "file received" indication will be preferably displayed on the display screen thereof to cue the feedlot manager to update the Feed Ration Master File using data contained in the received Feed Ration Change File. Preferably the updating process occurs at the beginning of each new day, but may also occur at any time during the day as required. When all files have been undated, the feedlot management computer system then transmits a copy of the Pen Master File, the Ration Master File, the Feed Ration Consumption History File and the Cattle Movement History File to the feedbunk reading computer system, as indicated at Block B in FIG. 14A. Shortly thereafter, the feedlot management computer system transmits a copy of the Pen Master File, the Ration Master File, and the Feed Ration Consumption History File to the feedlot veterinary computer system, as indicated at Block C in FIG. 14.

While the preferred embodiments of the system and method of the present invention have been described in detail, it will be appreciated that numerous variations and modifications of the present invention will occur to persons skilled in the art. All such variations and modifications shall constitute the present invention as defined by scope and spirit of the appended claims.

We claim:

1. A feedlot management system for installation in an animal feedlot, comprising:
    a database for maintaining geographical coordinate information representative of the positions of: said feedlot, at least one of objects and animals contained in said feedlot, and a feedlot vehicle located in the feedlot;
    wherein the feedlot vehicle is equipped with:
        a vehicle information acquisition mechanism comprising (i) a mobile global positioning system (GPS) receiver for acquiring vehicle information regarding at least one of the position and the orientation of said vehicle; and (ii) an information transmission mechanism for transmitting said vehicle information to said database.

2. The feedlot management system of claim 1, wherein said vehicle information acquisition mechanism comprises a satellite-based global positioning system, and said database is repeatedly updated using said vehicle information obtained from said satellite-based global positioning system.

3. The feedlot management system of claim 2, wherein said satellite based global positioning system (GPS) includes a local area differential (LAD) GPS receiver located in said feedlot, and in communication with a WAD (wide area differential) GPS receiver associated with said vehicle, said WAD (wide area differential) GPS receiver in communication with said database, and said LAD GPS receiver in communication with said database.

4. The feedlot management system of claim 2, wherein said database contains information on at least one of: pen location, bunk length, feed ration status and feedlot management functions; and said database receives updated vehicle positions based upon positions that are transmitted from each said feedlot vehicle.

5. The feedlot management system of claim 4, wherein the feedlot vehicle is remotely controlled through the feedlot by an operator using a remote workstation.

6. An animal feedlot management system which comprises:
    at least one feedlot vehicle employing:
        (a) an on-board feed delivery computer system which includes a feedlot modeling subsystem for maintaining a geometrical model of said feedlot and at least one of animals and objects contained therein; and
        (b) an information acquisition mechanism equipped for acquiring information from a satellite-implemented global positioning system (GPS);
            said computer system in communication with said information acquisition mechanism;
        a coordinate acquisition subsystem for acquiring coordinate information specifying the position of each said feedlot vehicle relative to a coordinate reference system symbolically representing said feedlot,
        a processing mechanism, coupled to the coordinate acquisition subsystem, for processing said coordinate information in order to repeatedly update said geometrical model; and
        a feed delivery mechanism for uniformly delivering a preassigned amount of feed ration along the length of a feedbunk in the feedlot in response to the processing mechanism repeatedly updating the geometrical model based upon information obtained from said coordinate acquisition subsystem.

7. The feedlot management system of claim 6 wherein said global positioning system (GPS) includes a local area differential (LAD) GPS local receiver located in said feedlot, said local receiver in communication with a WAD (wide area differential) GPS receiver associated with the at least one feedlot vehicle, and said local receiver is adapted for communication with the computer system in the at least one feedlot vehicle.

8. The feedlot management system of claim 6 further comprising a database containing a map of said feedlot information on pen location, bunk length, ration status, and the number and location of vehicles, said database in communication with said information acquisition mechanism for receiving updated vehicle positions that are transmitted from said at least one feedlot vehicle.

9. A method of managing an animal feedlot for use with: (i) a feedlot vehicle equipped with a global positioning (GPS) receiver coupled to an RF transmitter, and (ii) a central database coupled to an RF receiver, the central database including information on a location of at least one object on the animal feedlot; the method comprising the steps of:
    (a) the GPS receiver acquiring geographical coordinates representative of a current position of the feedlot vehicle;
    (b) the RF transmitter transmitting the acquired geographical coordinates to the RF receiver;
    (c) the RF receiver receiving the acquired geographical coordinates and downloading the geographical coordinates to the central database; and
    (d) the central database determining the current position of the feedlot vehicle relative to the at least one object on the animal feedlot.

10. The method of claim 9 further comprising: controlling the operations of said at least one feedlot vehicle based upon said information in said central database.

11. The method of claim 10 further comprising:
    providing said central database with information on bunk location, bunk orientation, and bunk length; and controlling said feedlot vehicle to move substantially parallel to one of said bunks and load said bunk with feed from said vehicle.

12. The method of claim 11 wherein said controlling step is executed by remote control.

13. An animal feedlot management system for installation in an animal feedlot, comprising:
    (a) at least one feedlot vehicle equipped with a mobile GPS receiver for acquiring vehicle information regarding at least one of the position and orientation of the vehicle;

(b) an updatable database for maintaining information representative of said feedlot and at least one of objects and animals contained in said feedlot; and (c) a transmission mechanism, coupled to the mobile GPS receiver, for transmitting vehicle information to the updatable database.

14. The feedlot management system of claim 13 wherein said database contains information of any of animal pen location, feedbunk length, feed ration status, and feedlot management functions, and said database also contains vehicle information received from the transmission mechanism.

15. The feedlot management system of claim 14 wherein the at least one feedlot vehicle is remotely controlled through the feedlot by an operator using a remotely situated workstation.

* * * * *